(12) United States Patent
Naanaa et al.

(10) Patent No.: US 12,407,510 B2
(45) Date of Patent: Sep. 2, 2025

(54) METHODS AND SYSTEMS FOR RANKING A PLURALITY OF WORKER AGENTS BASED ON A USER REQUEST

(71) Applicant: Portal AI Inc., Redwood City, CA (US)

(72) Inventors: Mohammad Naanaa, Hillsborough, CA (US); Volodymyr Panchenko, Hillsborough, CA (US); Manav Mehra, Toronto (CA); Ricardo Fornari, San Jose, CA (US)

(73) Assignee: Portal AI Inc., Redwood City, CA (US)

( * ) Notice: Subject to any disclaimer, the term of this patent is extended or adjusted under 35 U.S.C. 154(b) by 0 days.

(21) Appl. No.: 19/083,971

(22) Filed: Mar. 19, 2025

(65) Prior Publication Data
US 2025/0219832 A1    Jul. 3, 2025

Related U.S. Application Data

(63) Continuation of application No. 18/882,284, filed on Sep. 11, 2024, now Pat. No. 12,265,856.
(Continued)

(51) Int. Cl.
*G06F 9/30*    (2018.01)
*G06F 9/50*    (2006.01)
(Continued)

(52) U.S. Cl.
CPC ............ *H04L 9/32* (2013.01); *G06F 9/505* (2013.01); *G06F 9/54* (2013.01); *G06F 16/335* (2019.01);
(Continued)

(58) Field of Classification Search
None
See application file for complete search history.

(56) References Cited

U.S. PATENT DOCUMENTS 8,856,196 B2    10/2014    Yamada
8,856,335 B1    10/2014    Yadwadkar
(Continued)

FOREIGN PATENT DOCUMENTS

CA    2773326 A1    10/2012
EP    4184322 A1    5/2023
(Continued)

OTHER PUBLICATIONS

'How to Measure AI Agent Performance' from dialzara blog, Dec. 25, 2024. (Year: 2024).*
(Continued)

*Primary Examiner* — Steven G Snyder
(74) *Attorney, Agent, or Firm* — Blueshift IP; Robert Plotkin

(57) ABSTRACT

A method for identifying and clustering worker agents for processing requests includes receiving, by a core node, from a user agent, a user request. The core node updates, for each of the plurality of worker agents, an availability status, thereby producing a plurality of availability statuses. The core node computes, for each of the plurality of worker agents, a value of a drift metric. The core node clusters the plurality of worker agents to produce a plurality of clusters of worker agents, wherein each of the plurality of clusters contains worker agents that have similar semantic capabilities. Based at least on the user request, the plurality of availability statuses, and the plurality of clusters, the core node identifies a subset of the plurality of worker agents that are both available to process the user request and that are suitable for processing the user request.

20 Claims, 17 Drawing Sheets

Related U.S. Application Data

(60) Provisional application No. 63/537,979, filed on Sep. 12, 2023.

(51) Int. Cl.

| | | |
|---|---|---|
| *G06F 9/54* | (2006.01) | |
| *G06F 16/335* | (2019.01) | |
| *G06F 16/34* | (2019.01) | |
| *G06F 21/60* | (2013.01) | |
| *G06F 21/62* | (2013.01) | |
| *G06F 21/64* | (2013.01) | |
| *G06F 40/205* | (2020.01) | |
| *G06F 40/295* | (2020.01) | |
| *G06Q 10/0631* | (2023.01) | |
| *G06Q 10/0639* | (2023.01) | |
| *H04L 9/32* | (2006.01) | |

(52) U.S. Cl.
CPC .......... *G06F 16/345* (2019.01); *G06F 21/602* (2013.01); *G06F 21/6227* (2013.01); *G06F 21/64* (2013.01); *G06F 40/205* (2020.01); *G06F 40/295* (2020.01); *G06Q 10/06311* (2013.01); *G06Q 10/063112* (2013.01); *G06Q 10/06393* (2013.01); *G06F 2209/503* (2013.01); *G06F 2209/505* (2013.01)

(56) References Cited

U.S. PATENT DOCUMENTS

| | | | |
|---|---|---|---|
| 10,042,636 | B1 | 8/2018 | Srivastava |
| 10,042,886 | B2 | 8/2018 | Saadat-Panah |
| 10,872,204 | B2* | 12/2020 | Zhu ........................ G06F 40/216 |
| 11,037,554 | B1 | 6/2021 | Le Chevalier |
| 11,095,579 | B1 | 8/2021 | De Mazancourt |
| 11,463,585 | B1 | 10/2022 | Ahani |
| 11,494,851 | B1 | 11/2022 | Novak |
| 11,632,341 | B2 | 4/2023 | Wang |
| 11,715,042 | B1 | 8/2023 | Liu |
| 11,748,128 | B2 | 9/2023 | Chakraborti |
| 11,848,833 | B1 | 12/2023 | Govindaraju |
| 11,922,515 | B1 | 3/2024 | Lombard |
| 12,126,769 | B1 | 10/2024 | Koul |
| 12,238,213 | B1 | 2/2025 | Naanaa |
| 2002/0032723 | A1 | 3/2002 | Johnson |
| 2004/0249951 | A1 | 12/2004 | Grabelsky |
| 2007/0011281 | A1 | 1/2007 | Jhoney |
| 2007/0038610 | A1 | 2/2007 | Omoigui |
| 2009/0254336 | A1 | 10/2009 | Dumais |
| 2011/0138053 | A1 | 6/2011 | Khan |
| 2013/0080761 | A1 | 3/2013 | Garrett |
| 2013/0197954 | A1 | 8/2013 | Yankelevich |
| 2014/0341566 | A1 | 11/2014 | Smith |
| 2014/0359439 | A1 | 12/2014 | Lyren |
| 2014/0372160 | A1 | 12/2014 | Nath |
| 2015/0186154 | A1 | 7/2015 | Brown |
| 2015/0186189 | A1 | 7/2015 | Venkataraman |
| 2016/0292011 | A1 | 10/2016 | Colson |
| 2017/0039239 | A1 | 2/2017 | Saadat-Panah |
| 2017/0061356 | A1 | 3/2017 | Haas |
| 2017/0091590 | A1 | 3/2017 | Sawhney |
| 2017/0139789 | A1 | 5/2017 | Fries |
| 2017/0262304 | A1 | 9/2017 | Williams |
| 2017/0287038 | A1 | 10/2017 | Krasadakis |
| 2018/0096284 | A1 | 4/2018 | Stets |
| 2018/0189266 | A1 | 7/2018 | Venkataraman |
| 2018/0232255 | A1 | 8/2018 | Nordin |
| 2018/0268244 | A1 | 9/2018 | Moazzami |
| 2018/0293103 | A1 | 10/2018 | Kalmus |
| 2019/0004815 | A1 | 1/2019 | Povalyayev |
| 2019/0066016 | A1 | 2/2019 | Ghosh |
| 2019/0171822 | A1 | 6/2019 | Sjouwerman |
| 2019/0171984 | A1 | 6/2019 | Irimie |
| 2019/0236132 | A1* | 8/2019 | Zhu ........................ G06N 20/00 |
| 2019/0243916 | A1 | 8/2019 | Ashoori |
| 2019/0266254 | A1 | 8/2019 | Blumenfeld |
| 2020/0027553 | A1 | 1/2020 | Vaughn |
| 2020/0092232 | A1 | 3/2020 | Tojima |
| 2020/0142930 | A1 | 5/2020 | Wang |
| 2020/0159778 | A1 | 5/2020 | Mohanty |
| 2020/0195731 | A1 | 6/2020 | Guo |
| 2020/0293874 | A1* | 9/2020 | Ji ............................ G06N 3/08 |
| 2021/0043099 | A1 | 2/2021 | Du |
| 2021/0081250 | A1 | 3/2021 | Chauhan |
| 2021/0173682 | A1 | 6/2021 | Chakraborti |
| 2021/0173718 | A1 | 6/2021 | Patel |
| 2021/0288927 | A1 | 9/2021 | Wang |
| 2022/0036153 | A1 | 2/2022 | O'Malia |
| 2022/0179635 | A1 | 6/2022 | Fang |
| 2022/0197306 | A1 | 6/2022 | Cella |
| 2023/0040094 | A1 | 2/2023 | Huang |
| 2023/0060753 | A1 | 3/2023 | Matsuoka |
| 2023/0074406 | A1 | 3/2023 | Baeuml |
| 2023/0076327 | A1 | 3/2023 | Matsuoka |
| 2023/0089596 | A1 | 3/2023 | Huffman |
| 2023/0136226 | A1 | 5/2023 | Mo |
| 2023/0156690 | A1 | 5/2023 | Hao |
| 2023/0274094 | A1 | 8/2023 | Tunstall-Pedoe |
| 2023/0297860 | A1 | 9/2023 | Hosseini |
| 2023/0316172 | A1 | 10/2023 | Ayat |
| 2023/0359959 | A1 | 11/2023 | Harding |
| 2023/0368284 | A1 | 11/2023 | Sheikh |
| 2023/0376700 | A1 | 11/2023 | Bista |
| 2023/0410022 | A1 | 12/2023 | Childress |
| 2024/0267464 | A1 | 8/2024 | Koneru |
| 2024/0289863 | A1 | 8/2024 | Smith Lewis |
| 2024/0311617 | A1* | 9/2024 | Di Palo ................. G06V 10/82 |
| 2024/0346254 | A1 | 10/2024 | Liu |
| 2024/0346256 | A1 | 10/2024 | Qin |
| 2024/0394965 | A1 | 11/2024 | Doggett |

FOREIGN PATENT DOCUMENTS

| | | |
|---|---|---|
| WO | 2015061976 A1 | 5/2015 |
| WO | 2024182285 A2 | 9/2024 |

OTHER PUBLICATIONS

'What is AI agent evaluation?' by Cole Stryker from IBM 2025. (Year: 2025).*

'What Are AI Agents? Benefits, Examples, Types' by Salesforce, 2024. (Year: 2024).

Foy "Understanding Tokens & Context Windows" (2023) (https://blog.mlq.ai/tokens-context-window-llms/ (Year: 2023).

Guan, Lin, et al. "Leveraging pre-trained large language models to construct and utilize world models for model-based task planning." Advances in Neural Information Processing Systems 36 (2023): 79081-79094.

International Search Report and Written Opinion issued in International App. No. PCT/US2024/046328 dated Dec. 12, 2024, 8 pages.

Martineau, K, What is retrieval-augmented generation (RAG) ?. Aug. 22, 2023, IBM Research., https://research.ibm.com/blog/retrieval-augmented-generation-RAG pp. 1-8 (Year: 2023).

N Sonnino (Large Language Models as smart space aware social conversational agents)—2022—politesi.polimi.it (Year: 2022).

Notice of Allowance dated Jan. 24, 2025 for U.S. Appl. No. 18/882,398 (pp. 1-4).

Notice of Allowance dated Dec. 3, 2024 for U.S. Appl. No. 18/882,398 (pp. 1-11).

Notice of Allowance dated Dec. 18, 2024 for U.S. Appl. No. 18/882,373 (pp. 1-12).

Notice of Allowance dated Dec. 27, 2024 for U.S. Appl. No. 18/882,284 (pp. 1-15).

Office Action (Final Rejection) dated Mar. 17, 2025 for U.S. Appl. No. 18/830,895 (pp. 1-41).

Office Action dated Feb. 27, 2025 for U.S. Appl. No. 18/882,344 (pp. 1-30).

Office Action dated Mar. 3, 2025 for U.S. Appl. No. 18/882,326 (pp. 1-36).

(56) References Cited

OTHER PUBLICATIONS

Office Action dated Nov. 15, 2024 for U.S. Appl. No. 18/882,344 (pp. 1-24).
Office Action dated Nov. 27, 2024 for U.S. Appl. No. 18/882,326 (pp. 1-20).
Office Action dated Dec. 10, 2024 for U.S. Appl. No. 18/882,388 (pp. 1-28).

* cited by examiner

METHODS AND SYSTEMS FOR RANKING A PLURALITY OF WORKER AGENTS BASED ON A USER REQUEST

CROSS-REFERENCE TO RELATED APPLICATIONS

This application claims priority from U.S. patent application Ser. No. 18/882,284, filed on Sep. 11, 2024, entitled, "Methods and Systems for Identification and Semantic Clustering of Worker Agents for Processing Requests," which claims priority from U.S. Provisional Patent Application No. 63/537,979, filed on Sep. 12, 2023, entitled "Unified Network Protocol for Specialized Artificial Intelligence Agents," all of which are hereby incorporated by reference.

BACKGROUND

The disclosure relates to methods for ranking, platform-agnostic selecting, and executing of one or more artificial intelligence (AI) agents. More particularly, the methods and systems described herein relate to functionality for query decomposition, agent ranking, and execution of selected agents from a plurality of agents.

Conventionally, platforms that employ AI components are siloed away from each other, especially in scenarios in which different—and potentially competing—corporate entities develop and/or maintain the platforms. Such conventional AI systems typically execute within specific environments that may have conflicting technical requirements with other AI systems and may lack functionality required for interoperability, as well as introducing inefficiencies, redundances, and weaknesses regarding data security and privacy. Furthermore, conventional technology typically fails to provide functionality for identifying one (or more) tasks within received input (whether from a human user or an application) and determining which of the many available AI platforms provide functionality for executing such tasks.

Therefore, there is a need for technological improvements to systems for identifying functionality needed to execute one or more tasks identified in connection with analyzed data, directing the execution of the identified functionality, and generating and providing output responsive to the requested tasks.

SUMMARY

In one aspect, a method for identifying and clustering worker agents suitable for processing a user request includes receiving, by a core node, from a user agent, a user request, the user request including a description of at least one task. The method includes updating, by the core node, for each worker agent W in the plurality of worker agents, an availability status for the worker agent W, thereby producing a plurality of availability statuses for the plurality of worker agents. The method includes computing, by the core node, for each worker agent W in the plurality of worker agents, a value of a drift metric for the worker agent W, the computing comprising: computing, for the worker agent W, a relevance score representing a relevance of a plurality of responses provided by the worker agent W to a plurality of user requests, thereby computing a plurality of relevance scores for the plurality of worker agents; computing the value of the drift metric for the worker agent W based on the relevance score for the worker agent W; and updating the availability status of the worker agent W to the "unavailable" status if the value of the drift metric for the worker agent W satisfies a predetermined criterion. The method includes clustering, by the core node, the plurality of worker agents to produce a plurality of clusters of worker agents, wherein each of the plurality of clusters contains worker agents that have similar semantic capabilities. The method includes based on the user request, the plurality of availability statuses, the plurality of relevance scores, and the plurality of clusters, identifying, by the core node, a subset of the plurality of worker agents that are both available to process the user request and that are suitable for processing the user request.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1A:
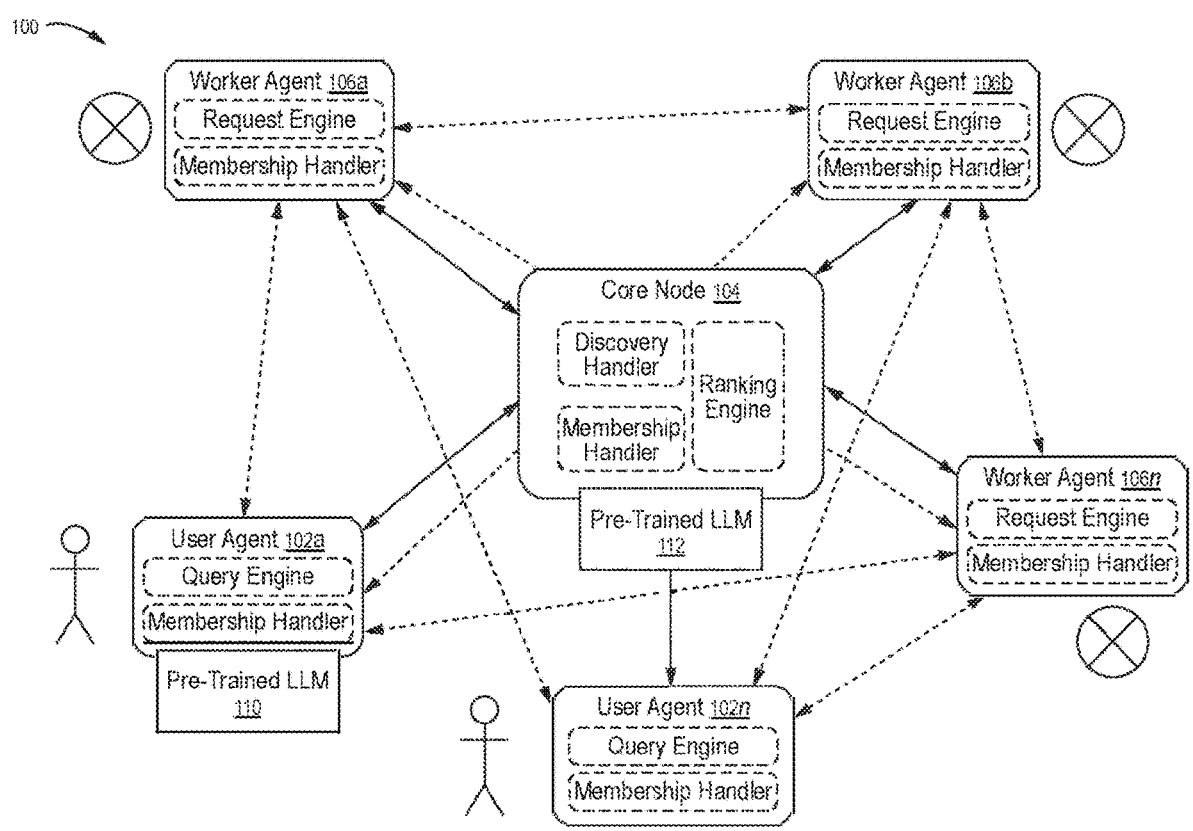
FIG. 1A is a block diagram depicting an embodiment of a system for query decomposition, agent ranking, and execution of selected agents from a plurality of agents.

The methods and systems described herein may provide functionality for ranking, platform-agnostic selecting, and executing of one or more artificial intelligence agents. More particularly, the methods and systems described herein relate to functionality for query decomposition, agent ranking, and execution of selected agents from a plurality of agents.

Implementation of the methods and systems described herein may provide improve processing of user input by a plurality of dynamically ranked and selected agent applications, which may execute in a decentralized, network-based system. The agent applications (which may also be referred to herein as AI agents, as agent components, as AI entities, as agents, or as AI applications) may exchange data to execute one or more tasks identified within a query. The methods and systems described herein may provide functionality catering to online service interactions and providing personalized responses based on user preferences. Such systems may result in improved output to user input at least in part by leveraging the capabilities of AI and decentralization to provide tailored, efficient, and responsive service interactions. Implementation of the methods and systems described herein may result in a more unified approach to identification and execution of various applications and in unification of what is currently a vast and fragmented digital AI agent landscape. The methods and systems described herein may further provide functionality providing safeguards that effectively deter and handle potential spamming, flooding, and other malicious activities, ensuring the integrity and availability of the network.

The systems described herein may include functionality for executing a scalable, decentralized network protocol in a network of dynamic, independent, specialized AI agents, the system designed to facilitate seamless interactions among multiple online services and platforms, without requiring navigation through disparate interfaces, reducing the cognitive load, inefficiencies, and limitations associated with multi-platform use. Implementation of AI agents as described herein may result in execution of new types of AI agents, which may communicate, collaborate, and share resources efficiently because the protocols implemented by such AI agents may standardize agent communication methods, data formats, and interaction patterns (e.g., relating to agent enrollment, discovery, and ranking), ensuring that AI agents, regardless of underlying architecture or primary function, can discover other AI agents for collaboration, understand and respond to requests from other AI agents. Each of the AI agents may execute functionality for completing tasks associated some services and not others, with varying degrees of specialization. Such systems may provide unified platform that enables data exchange, smooth interaction, collaboration, and task execution between various specialized AI agents catering to specific online products and services. Such systems may execute a dynamic agent discovery and ranking mechanism in which a network node identifies, on behalf of one or more user agents, one or more available worker agents executing functionality for completing tasks received by the user agents from one or more associated users; such systems may ensure that user agents can identify and access the latest and better ranked services and functionalities as the network grows and the services provided by nodes on the network increase. Furthermore, the systems described herein may execute mechanisms that continually adapt to individual preferences and historical behaviors, resulting in outcomes that may be tailored to each user's unique requirements.

In some embodiments, AI agents are software systems designed to perceive their environment, make decisions, and take actions to achieve specific goals. Unlike conventional computers that simply follow pre-programmed instructions, AI agents may gather information from their environment through various inputs; process this information and make decisions based on it; take actions that affect their environment to achieve their goals; and improve their performance over time based on experience (e.g., learn). AI agents may operate independently, making decisions without constant human input. AI agents may be programmed work towards specific objectives, rather than just performing pre-defined tasks. AI agents may be adaptable and may adjust their behavior based on changes in their environment, improving their performance over time through experience and feedback. Additionally, AI agents may actively engage with and influence their environment, rather than passively processing data.

An AI agent may include and/or utilize one or more models that have been trained using machine learning techniques, commonly referred to as "machine learning models." These models enable the AI agent to process input data, make decisions, and generate outputs based on patterns learned from training data. Examples of types of machine learning training that may be used to train a machine learning model within or otherwise used by an AI include any one or more of the following in any combination: supervised learning, unsupervised learning, reinforcement learning, and transfer learning. Examples of types of machine learning models that may be included in or otherwise used by an AI agent include neural networks (e.g., deep learning models), decision trees, random forests, Support Vector Machines (SVMs), Bayesian models, generative models (e.g., Generative Adversarial Networks (GANs), Variational Autoencoders (VAEs)), and transformer models. Language models, such as large language models and generative language models, are also examples of machine learning models.

Referring now to FIG. 1A, a block diagram depicts one embodiment of a system for query decomposition, agent ranking, and execution of selected agents from a plurality of agents. In brief overview, the system 100 includes a plurality of user agents 102*a-n*, a core node 104, a first pre-trained large language model (LLM) 110, a second pre-trained LLM 112, and a plurality of worker agents 106*a-n*. The particular numbers of user agents 102*a-n* and worker agents 106*a-n* shown in FIG. 1A is merely an example; more generally, there may be any number of user agents 102*a-n* and any number of worker agents 106*a-n*, and the number of user agents 102*a-n* may be the same as or differ from the number of worker agents 106*a-n* (i.e., the use of "n" is a generic variable and does not imply that the number of user agents 102*a-n* must be the same as the number of worker agents 106*a-n*). Furthermore, any two or more user agents 102*a-n* may share properties and/or have properties that differ from each other in any of a variety of ways. Similarly, any two or more worker agents 106a-n may share properties and/or have properties that differ from each other in any of a variety of ways.

Each of the user agents 102a-n may be associated with one or more corresponding users. A user that is associated with a particular user agent may be referred to herein as "the user agent's user," and that user agent may be referred to as "the user agent of the user" or "the user agent associated with the user." Any two user agents may be associated with the same or different users. Any two users may be associated with the same or different user agents. A user may be human, machine (e.g., a computer or computer component), software, or any combination thereof. The system 100 may include any combination of human, machine, and software users. For example, all of the users in the system 100 may be human. As another example, all of the users in the system 100 may be software (such as a plurality of different software applications or components). As another example, some of the users in the system 100 may be human, while some of the users in the system 100 may be software.

The components of the system 100 may be executed by a type or form of computing device (as described in greater detail below in connection with FIGS. 8A-8C) that has been modified to execute instructions for providing the functionality described herein; these modifications result in a new type of computing device that provides a technical solution to problems rooted in computer technology, such as identification of, and distribution of tasks to, AI agent applications executing on a distributed plurality of nodes on a network, and, in some embodiments, to AI agent applications developed and/or maintained by different entities.

Use of the methods and systems described herein, including implementation of a distributed asynchronous communication framework and leveraging innovative message queue systems, may ensure resilient, efficient, and scalable inter-agent communication. Agents may be incorporated into the network through a structured and secure enrollment process, ensuring consistency and accountability. The interactions between the AI agents may be scalable and allow for the integration of new agents without significant alterations to the existing infrastructure.

User agents 102a-n (which may be referred to more generally herein as user agents 102), worker agents 106a-n (which may be referred to more generally herein as worker agents 106), and the core node 104 may be autonomous agents, that is computer programs executing one or more types of artificial intelligence components to identify and execute tasks in a computing environment automatically (e.g., without direct human instruction). Each of these components may include or be in communication with one or more machine learning engines.

User agents 102a-n, acting on user inputs, may communicate with the core node to (1) request decomposition of user requests into atomic tasks, (2) locate one or more worker agents 106a-n, and (3) select one or more worker agents 106a-n for task executions. Complex tasks that would traditionally necessitate maneuvering through multiple platforms may instead be described in a singular user request and may be executed by multiple worker agents 106a-n.

The user agents 102a-n may generate and display user interfaces for receiving user input. The user agents 102a-n may generate and display personalized or otherwise customized user interfaces for different users. The user agents 102a-n may collate user requests.

The user agents 102a-n may execute one or more discovery mechanisms (which may also be referred to as dynamic agent discovery features) to search, directly or indirectly, a network of worker agents 106a-n to execute tasks. The user agents 102a-n may communicate with the core node 104. The user agents 102a-n may optionally include or be in communication with a pre-trained LLM 110 and/or a pre-trained LLM 112. The user agents 102a-n may be provided as a software component executed on a computing device. The user agents 102a-n may be provided as a hardware component integrated into a computing device. The user agent 102 may access and use stored user data to personalize the user experience (including personalization of user interfaces and personalization of worker agent selections).

The user agents 102a-n may optionally execute a membership handler. The membership handler may include functionality for governing agent enrollment, authentication, and ongoing membership within the system 100, ensuring establishment and maintenance of a trusted (e.g., authenticated) relationship with the core node 104 and/or other components of the system 100.

The user agents 102a-n may optionally execute a query engine. The query engine may execute functionality for decomposing a user request into a plurality of sub-tasks. The query engine may orchestrate distributed task execution. The query engine may aggregate received output into a final result upon receiving output from the core node 104 and/or from one or more worker agents 106a-n.

The worker agents 106a-n may be AI agents specialized to interface with specific online products or services, serving as dedicated proxies for their respective external platforms. The worker agents 106a-n may be AI agents specialized to solve particular tasks and/or to perform operations on particular types of data. The worker agents 106a-n may function as proxies for one or more services; that is, instead of, or in addition to, executing functionality to directly complete some or all tasks within a user request, the worker agents 106a-n may be in communication with one or more other services from which the worker agents 106a-n may request completion of some or all tasks within a user request, receive output data, and provide the output data to another component in the system 100 (such as the user agents 102a-n or the core node 104). The worker agents 106a-n may be provided as a software component executed on a computing device. The worker agents 106a-n may be provided as a hardware component integrated into a computing device. The worker agents 106a-n may be provided by different entities. In some embodiments, there may be minimal or no communication or collaboration available between worker agents provided by different, potentially competing, business entities but the implementation of the methods and systems described herein may provide functionality executed by the core node 104 through which the user agents 102 may identify and communicate with a plurality of worker agents to receive output for portions of user requests, regardless of whether such worker agents (or the services to which they connect) include functionality for connecting or collaborating with other worker agents or services.

The worker agents 106a-n may optionally execute a membership handler. The membership handler may include functionality for governing agent enrollment, authentication, and ongoing membership within the system 100, ensuring establishment and maintenance of a trusted (e.g., authenticated) relationship with the core node 104 and/or other components of the system 100.

The worker agents 106a-n may optionally execute a request engine. The request engine may be in communication with one or more other services from which the request engine may request completion of some or all tasks within a user request, receive output data, and provide the output data to another component of the system 100 (such as the user agents 102a-n or the core node 104).

The user agents 102 and the worker agents 106 may communicate with each other directly, typically after being provided with connection information by the core node 104. The user agents 102 may send requests for task execution to the worker agents 106 via such direct connections. The user agents 102 may receive output generated during task execution from the worker agents 106 via such direct connections. In FIG. 1A, the dashed lines represent agent-to-agent communications.

The user agents 102 and the worker agents 106 may communicate with the core node 104. The connection between an agent 102 or 106 and the core node 104 may serve as a gateway to the system 100, enabling agent discovery after which the agents may directly connect with each other. In FIG. 1A, the solid lines represent communications between the core node 104 and agents or between.

The core node 104 may execute functionality for enrolling agent applications into the system 100. The core node 104 may execute an enrollment process to enroll and verify the authenticity and/and or capabilities of one or more agent applications. The core node 104 may execute functionality for populating, maintaining, and/or dynamically updating an agent directory that classifies and organizes agents based at least on agent capabilities and specializations.

The core node 104 may execute functionality for identifying worker agents 106a-n. The core node 104 may optionally execute a discovery handler for searching for and identifying one or more worker agents 106.

The core node 104 may optionally execute a ranking engine for ranking one or more worker agents 106 in the system 100. The core node 104 may execute functionality for ranking one or more worker agents 106a-n. The core node 104 may execute functionality for ranking the one or more worker agents 106a-n based upon criterion such as performance, user feedback, and latency statistics, which may ensure that the best-suited agent(s) executes on a particular request, thereby improving service quality. The core node 104 may be provided as a software component executed on a computing device. The core node 104 may be provided as a hardware component integrated into a computing device.

The core node 104 may optionally execute a membership handler. The membership handler may execute a method for enrolling worker agents 106 into the system 100.

The core node 104 may be in communication with one or more user agents 102a-n. The core node 104 may be in communication with one or more worker agents 106a-n. The core node 104 may optionally include or be in communication with a pre-trained LLM 112 for processing incoming natural language requests, including conversion of incoming requests into one or more executable action items, based at least in part on available worker agents 106.

In one embodiment, the pre-trained LLM 110 and the pre-trained LLM 112 are large language models. However, in an alternate embodiment, the functionality described in connection with the components 110 and 112 is provided by one or more small language models. In a further alternate embodiment, the functionality described in connection with the components 110 and 112 is provided by a machine learning model other than a large language model.

The system 100 may utilize a distributed message-queueing system for the queue mechanism to provide robustness, reliability, and extensive options for scalability. By adhering to this decoupled, asynchronous approach, the system 100 may provide a scalable, efficient, and resilient mode of communication, enabling diverse and dynamic interactions among the agents. The core node 104, the user agents 102, and the worker agents 106 may utilize a distributed message queue system integrated within a unified network protocol, which may provide asynchronous, resilient, and efficient communication among agents. The distributed message queue system may include a fail-safe mechanism to ensure message delivery even in the event of disruptions to the network. The interface between agents may result in coordinated interactions for fulfilling all or portions of user requests. Agents may use the distributed message queue system in communicating with other components of the system 100. Agents may publish messages to specific topics or channels designated for distinct tasks or services, ensuring that relevant agents consume these messages. Agents may subscribe to specific topics or channels relevant to their functionality; when a message becomes available in a subscribed topic, a subscribing agent may retrieve the message and process the message and may optionally publish a response to a different topic. Agents may transmit messages in the system in a standardized format, encapsulating meta-information such as, without limitation, sender ID, intended recipient, timestamp, message type, and payload; the payload may contain the main content of the message. The distributed message queue system may retain messages until the messages are successfully consumed by a target agent, which may ensure that no information is lost (e.g., in the case of temporary agent downtimes). Once a message is consumed and processed, agents may send an acknowledgment back to the system. In the event of processing failures, error messages are generated and can be acted upon by either the sender, recipient, or administrative nodes.

The system 100 may incorporate a security framework to safeguard the communication and data exchange among agents. The system 100 may incorporate a feedback loop to allow for the continuous improvement of agent interactions based on user feedback and system analytics.

The core node 104 may include or be in communication with a database. The user agents 102a-n may each include or be in communication with a database. The worker agents 106a-n may each include or be in communication with a database. The databases may be ODBC-compliant databases. For example, the databases may be provided as ORACLE databases, manufactured by Oracle Corporation of Redwood Shores, CA. In other embodiments, the databases may be Microsoft ACCESS databases or Microsoft SQL server databases, manufactured by Microsoft Corporation of Redmond, WA. In other embodiments, the databases may be SQLite databases distributed by Hwaci of Charlotte, NC, or PostgreSQL databases distributed by The PostgreSQL Global Development Group. In still other embodiments, the databases may be custom-designed databases based on an open-source database, such as the MYSQL family of freely available database products distributed by Oracle Corporation of Redwood City, CA. In other embodiments, examples of databases include, without limitation, structured storage (e.g., NoSQL-type databases and Bigtable databases), HBase databases distributed by The Apache Software Foundation of Forest Hill, MD, MongoDB databases distributed by 10Gen, Inc., of New York, NY, an AWS DynamoDB distributed by Amazon Web Services and Cassandra databases distributed by The Apache Software Foundation of Forest Hill, MD. In further embodiments, the databases may be any form or type of database.

Although, for ease of discussion, the components described in FIG. 1, are described as separate modules, it should be understood that this does not restrict the architecture to a particular implementation. For instance, some or all of the components may be encompassed by a single circuit or software function or, alternatively, distributed across a plurality of computing devices.

Figure 1B:
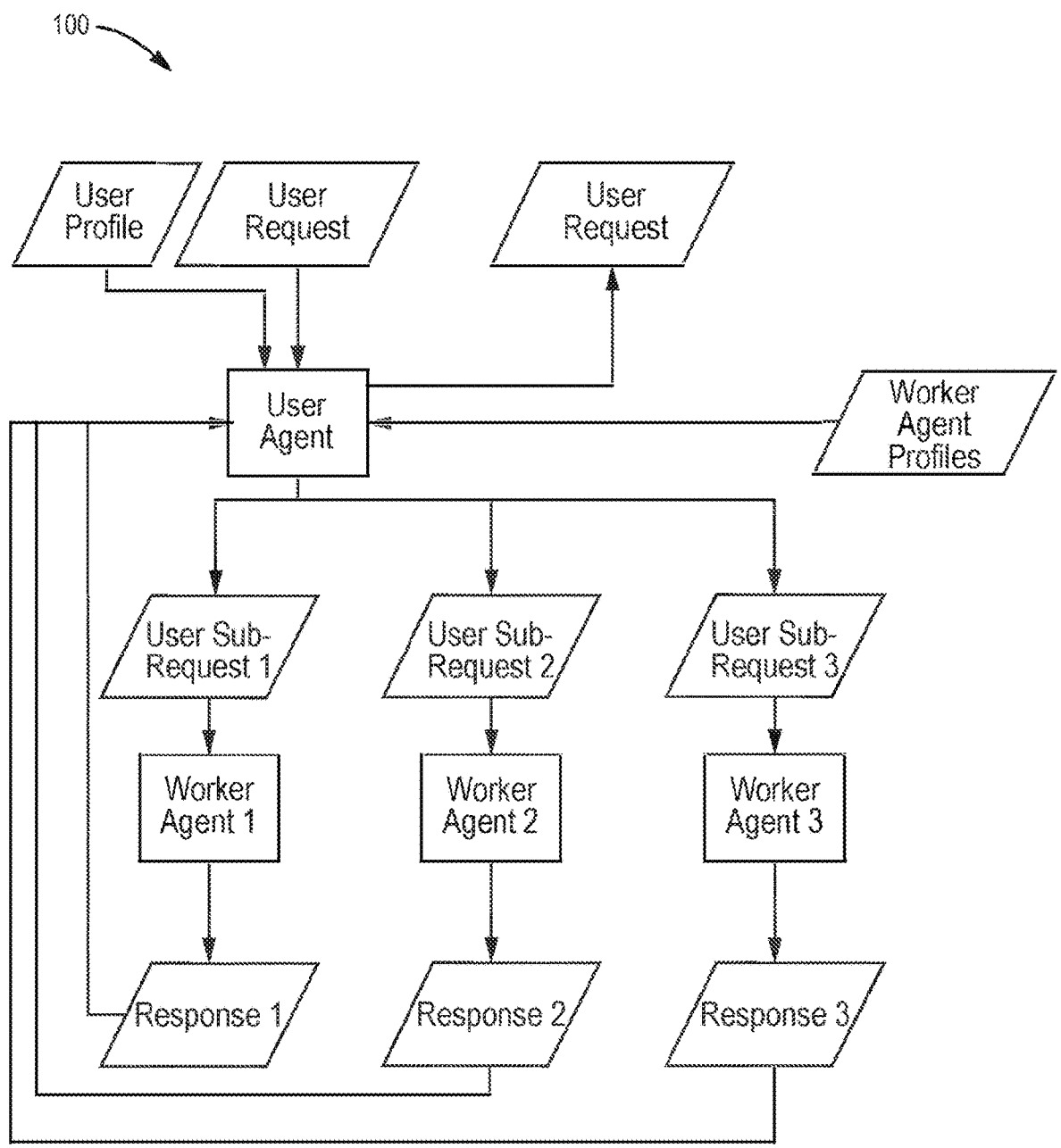
FIG. 1B is a block diagram depicting an embodiment of a user agent and a plurality of worker agents in a system for query decomposition, agent ranking, and execution of selected agents from a plurality of agents.

Referring now to FIG. 1B, a block diagram depicts an embodiment of a user agent 102 and a plurality of worker agents 106 in the system 100 for query decomposition, agent ranking, and execution of selected agents from a plurality of agents. As described in greater detail below, the user agent receives at least one user agent from a user and at least one worker agent profile from the core node 104. The user agent 102 oversees the decomposition of the user request into a plurality of sub-tasks (described as sub-requests in FIG. 1B; each sub-request may include one or more sub-tasks). The user agent 102 communicates with the core node 104 to have the core node generate (or re-generate) a ranking of a subset of worker agents 106 based upon attributes of the user request (including customization details associated with the user and with a type of task identified in the user request) and to have the core node 104 identify, for each sub-task, a best worker agent 106. The user agent 102 may communicate directly with the identified best worker agent 106 and receive a response to the sub-task from the worker agent 106 (which itself may have communicated with another service to have the sub-task processed and the response generated). The user agent 102 may return each response to the corresponding user or, in the event of receiving a plurality of responses associated with a single user request, the user agent 102 may aggregate the responses and return the aggregated response to the user corresponding to the user request.

Figure 1C:
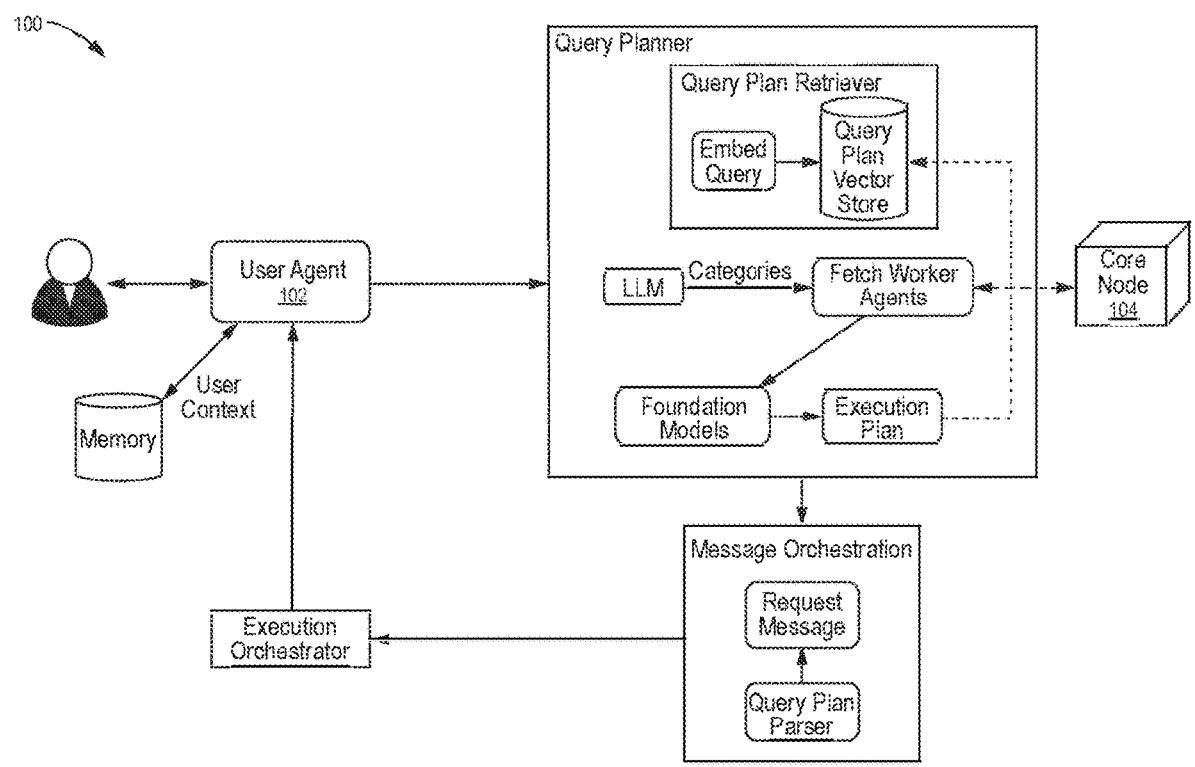
FIG. 1C is a block diagram depicting an embodiment of a system for query decomposition, agent ranking, and execution of selected agents from a plurality of agents.

Referring now to FIG. 1C, a block diagram depicts an embodiment of a system 100 for query decomposition, agent ranking, and execution of selected agents from a plurality of agents. As shown in FIG. 1C, and as described in greater detail below, the user agent 102 may execute functionality for decomposing tasks and communicating with the core node 104 to identify a subset of worker agents 106; this functionality may be provided by a query planner, an execution orchestrator, and a message orchestration component and the user agent 102 may include these components or may be in communication with such components executing separately from the user agent 102. As shown in FIG. 1C, the user agent 102 may execute a query plan retriever to generate an embedding of the user request (which may be stored in a query plan vector store 120) and communicate with the core node 104 to identify one or more worker agents 106 to which to assign one or more sub-tasks identified within the user request. The user agent 102 may execute one or more machine learning components to identify specific worker agents 106 to which to assign one or more sub-tasks.

Figure 2A:
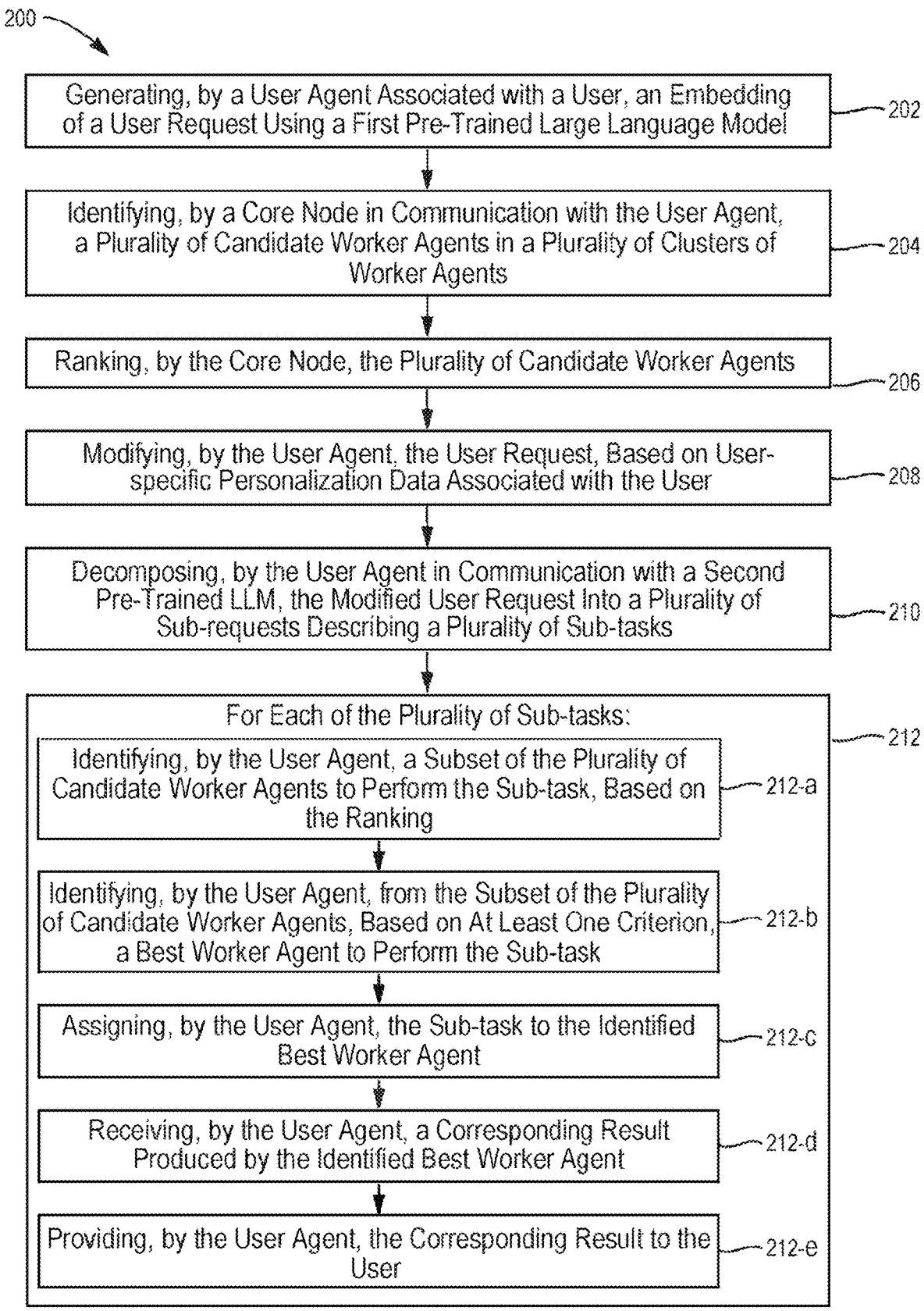
FIG. 2A is a flow diagram depicting an embodiment of a method for assigning a plurality of worker agents to perform a plurality of sub-tasks associated with a user request.

Referring now to FIG. 2A, in brief overview, a block diagram depicts one embodiment of a method 200 for assigning a plurality of worker agents to perform a plurality of sub-tasks associated with a user request. The method 200 includes generating, by a user agent associated with a user, an embedding of a user request using a first pre-trained large language model (202). The method 200 includes identifying, by a core node in communication with the user agent, a plurality of candidate worker agents in a plurality of clusters of worker agents (204). The method includes ranking, by the core node, the plurality of candidate worker agents (206). The method includes modifying, by the user agent, the user request based on user-specific personalization data associated with the user (208). The method includes decomposing, by a second pre-trained LLM, the modified user request into a plurality of sub-requests describing a plurality of sub-tasks (210). For each of the plurality of sub-tasks, the user agent identifies a subset of the plurality of candidate worker agents to perform the sub-task, based on the ranking (212-a). For each of the plurality of sub-tasks, the user agent identifies, from the subset of the plurality of candidate worker agents, based on at least one criterion, a best worker agent to perform the sub-task (212-b). For each of the plurality of sub-tasks, the user agent assigns the sub-task to the identified best worker agent (212-c). For each of the plurality of sub-tasks, the user agent receives a corresponding result produced by the identified best worker agent (212-d). For each of the plurality of sub-tasks, the user agent provides the corresponding result to the user agent (212-e).

Figure 2B:
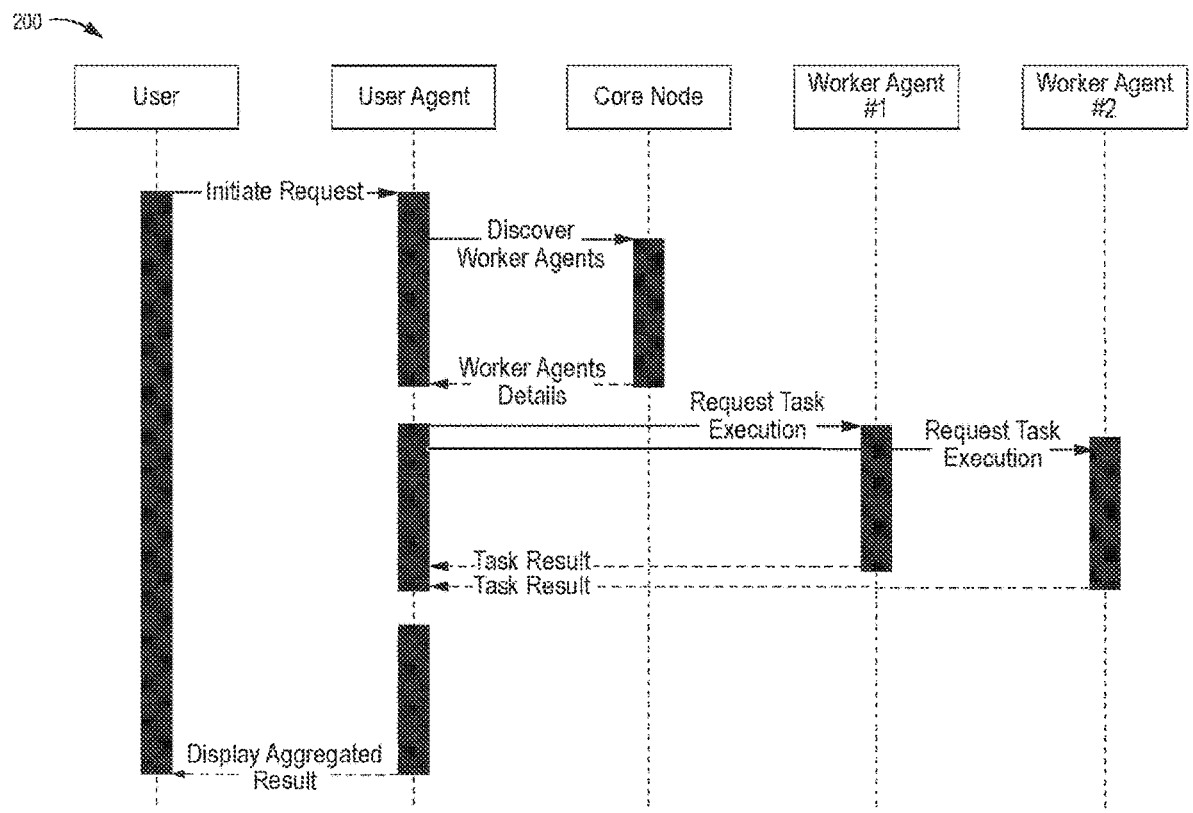
FIG. 2B is a flow diagram depicting an embodiment of a method for assigning a plurality of worker agents to perform a plurality of sub-tasks associated with a user request.

Referring now to FIG. 2A, in greater detail and in connection with FIGS. 1A and 2B, the method 200 includes generating, by a user agent associated with a user, an embedding of a user request using a first pre-trained large language model. The user agent 102 may generate the embedding of the user request. As will be understood by those of skill in the art, an embedding may serve as a dense, fixed-size vector representing semantic content identified within the user request.

The user agent 102 may generate additional data relating to the user request such as, by way of example, a discovery query delineating one or more criterion for specifying a type of worker agent 106 needed by the user agent 102 to complete one or more sub-portions of the user request. The additional data may include user-specific personalization data stored in the agent memory. The additional data may include metadata such as context data including, without limitation, user preferences, history, and other data with which the agents may customize the search and/or results based on user data.

The user agent 102 may communicate with the core node 104 to analyze one or more received requests and identify and select one or more worker agents 106 to execute the one or more requests, based upon rankings of the one or more worker agents 106.

The method 200 includes identifying, by a core node in communication with the user agent, a plurality of candidate worker agents in a plurality of clusters of worker agents (204). The core node 104 may access a dynamically updated directory of worker agents 106 to identify the plurality of candidate worker agents. The directory may classify agents, by way of example, based on agent capabilities, specializations, and other meta-attributes, for instance, based on the online services or products agents cater to and/or interface with. The core node 104 may update the directory to account for new agent enrollments, agent retirements, or capability changes, which may ensure that the discovery process remains current, relevant, and comprehensive. The core node 104 may leverage a machine learning model, including, without limitation, a large language model (such as the large language model 112) to characterize one or more of the worker agents 106 and generate clusters (e.g., logical clusters) of the worker agents 106 based upon the worker agents' capabilities and functionalities. The following table describes one embodiment of the directory of worker agents 106:

| Attribute | Description |
| --- | --- |
| Agent UID | Unique identifier for the agent. |
| Agent Type | Specifies if the agent is a User or Worker Agent. |
| Capabilities | A list or set of services or tasks the agent can perform, relevant for Worker Agents. |
| Public Key | The public key of the agent used for cryptographic operations. |
| Enrollment Status | Indicates if the agent is provisionally accepted, permanently enrolled, or in a trial phase. |
| Last Active | Timestamp of the agent's last activity or interaction in the network. |
| Service Details | Specific details about the services offered by Worker Agents, such as service name, version, etc. |
| Feedback Score | (Optional) Average feedback or rating score from interactions, relevant for Worker Agents. |
| Communication Channels | Topics or channels the agent is subscribed to or can be reached at. |

The core node 104 may search the directory to identify the worker agents 106 having functionality that aligns with criteria specified by the user agent 102. As will be described in further detail below, for each discovery query, the core node 104 may provide not just a list of matching worker agents 106 but a prioritized list, dynamically generated for each request, providing an improved level of real-time relevance.

The method 200 includes ranking, by the core node, the plurality of candidate worker agents (206). The core node 104 may execute a ranking mechanism to rank the plurality of candidate worker agents 106. The ranking mechanism may evaluate one or more factors to rank the candidate worker agents 106, including, but not limited to, historical performance data of a candidate worker agent 106, feedback or ratings (if available) from previous interactions, specificity and relevance of the capabilities of a candidate worker agent 106 that relate to the current user request or sub-task, latency or response time statistics from past engagements, and a load and/or current activity level of the candidate worker agent 106.

In some embodiments, the core node 104 receives, from the user agent 102, the user request and/or the embedding of the user request. The core node 104 may, optionally, modify a ranking of one or more candidate worker agents based upon analyzing one or more attributes of the user request and/or of the embedding.

The method 200 includes modifying, by the user agent, the user request based on user-specific personalization data associated with the user (208). In addition to the ranking described above, the user agent 102 may overlay user-specific preferences based on past interactions, stored user data, or user-set priorities, which may ensure a fine-tuned match, enhancing a level of accuracy and/or fitness for purpose of the user and/or user satisfaction.

The method 200 includes decomposing, by the user agent in communication with a second pre-trained LLM, the modified user request into a plurality of sub-requests describing a plurality of sub-tasks (210). The user agent 102 may direct the decomposing by the second pre-trained LLM 112. The core node 104 may direct the decomposing by the second pre-trained LLM 112.

The second pre-trained LLM 112 may be pre-trained (and/or fine-tuned) specifically to decompose user requests into pluralities of sub-requests. Such decomposition may support query planning when searching a dynamically changing list of agents for a best agent to process a given sub-request. The second pre-trained LLM 112 may be trained based on data such as results of querying historical logs (when available), synthetic data generation for queries and query plan using LLMs based on predefined templates, rules and simulations. The training process may include annotating a query with an optimal query plan and include metadata such as execution time, resource usage, success rate, and other relevant performance metrics. The loss function may be designed to optimize sequence-to-sequence loss minimizing the cross entropy loss of the tokens being output as plans from the models, task-specific loss minimizing the resource usage and execution time, and reinforcement learning for rewarding the model for generating a plan successfully.

For each of the plurality of sub-tasks, the user agent identifies a subset of the plurality of candidate worker agents to perform the sub-task, based on the ranking (212-a). A matching algorithm may be employed to assign the best available worker agent to each sub-task. The matching algorithm may incorporate factors such as task suitability, past performance, availability, agent load, and capability specificity to assign AI agents to sub-tasks. Task suitability may be adjusted by a specificity score, which favors agents with narrower, more focused capabilities over those with broader, less specialized ones. The final score for each agent may be calculated using a weighted formula that balances these factors, ensuring that specialized agents are prioritized for tasks closely aligned with their expertise. The algorithm is designed to adapt over time, refining its weighting based on feedback from task outcomes. A final score may be the sum of multiplying each of suitability, performance, availability, load, and specificity by a corresponding weight. Specificity may be identified by dividing 1 by 1 plus a number of task categories. Suitability may be computing by identifying a cosine similarity between the embeddings of the subtask description and of the agent description. The system may track and store metrics for performance, availability, and load. In the event that a worker agent 106 is determined to be unavailable or overburdened, the core node 104 may execute a fallback mechanism; for example, the core node 104 may re-rank the worker agents 106 or adjust one or more task parameters to enable utilization of available worker agents 106.

For each of the plurality of sub-tasks, the user agent identifies, from the subset of the plurality of candidate worker agents, based on at least one criterion, a best worker agent to perform the sub-task (212-b). The user agent 102 may execute a discovery mechanism to identify the best worker agent 106. The user agent 102 may with the best worker agent 106 via the distributed message queue system. The user agent 102 may receive data associated with the best worker agent 106 for communication with the best worker agent 106 from, for example, the core node 104; the data may include a user identifier of the identified best worker agent 106, capabilities of the identified best worker agent 106, communications channels for exchanging data with the identified best worker agent 106, and any other attributes of the identified best worker agent 106 associated with completion of the sub-task. The core node 104 may dynamically update clusters based on new data about the worker agents' capabilities, thereby ensuring that the system adapts to evolving user needs and agent capabilities. The user agent 102 receiving the identification of the best worker agent 106 may locally cache identifiers of frequently interacted worker agents to minimize lookup times in subsequent interactions.

For each of the plurality of sub-tasks, the user agent assigns the sub-task to the identified best worker agent (212-c). The user agent 102 may communicate with the selected one or more worker agents 106 to fulfill the user request. The user agent 102 may generate a standardized request message in accordance with the protocols of the distributed message queuing system to assign the sub-task to the identified best worker agent 106. The message may include the details of the sub-task, parameters, and other relevant metadata for use in processing the sub-task. Leveraging a message queue-based approach, the user agent 102 may place the request in a designated queue for the identified best worker agent 106. This asynchronous methodology ensures that neither agent needs to be continuously active, awaiting responses, thereby conserving computational resources. As shown in FIG. 2B, multiple worker agents 106 may process and execute one or more requests or sub-tasks within requests; this processing and execution may occur in parallel.

The identified best worker agent 106, which may have subscribed to the designated queue for receiving messages, may fetch the message and process the request. To process the request, the identified best worker agent 106 may interface with a service for executing the request (such as, without limitation, an online service and/or product for which the identified best worker agent 106 is tailored), execute the functionality needed to process the task, and prepare and send a response to the user agent 102. The response may range from data retrieval to data transformations, to task status updates.

For each of the plurality of sub-tasks, the user agent receives a corresponding result produced by the identified best worker agent (212-d). The identified best worker agent 106 may encapsulate the response into the standardized message structure specified by the distributed message queue system and use the distributed message queue system to transmit the response to the user agent 102 via the corresponding message queue.

Figure 2C:
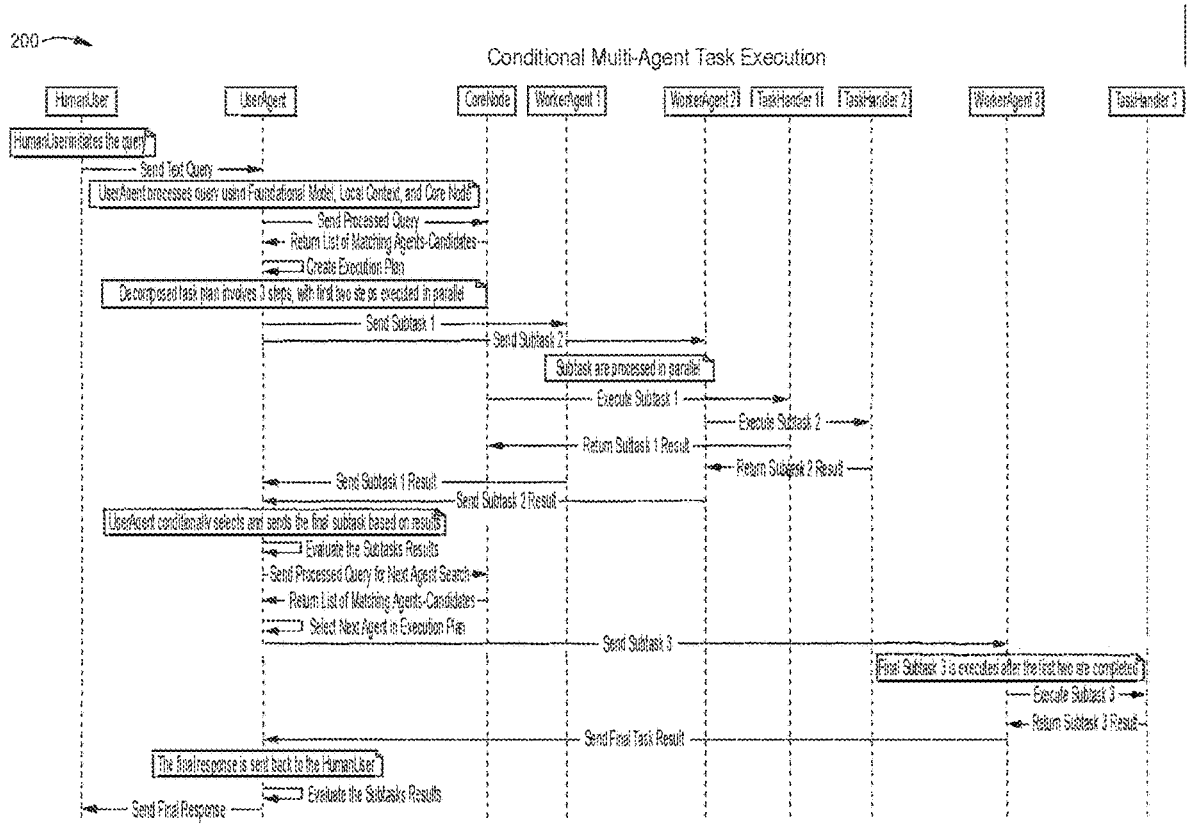
FIG. 2C is a workflow diagram depicting an embodiment of a method in which a user agent sends sub-tasks for processing conditionally.

The user agent 102 may send sub-tasks to worker agents 106 for processing in parallel. The user agent 102 may send sub-tasks to worker agents 106 for processing serially. Referring now to FIG. 2C, a workflow diagram depicts an embodiment of a method in which the user agent 102 sends sub-tasks for processing conditionally; that is, sending at least one sub-task to a first worker agent 106a for processing and then determining whether to send a second sub-task to a second worker agent 106b based upon receiving and analyzing at least one response from the first worker agent 106a. The user agent 102 may communicate with the core node 104 to select each of the worker agents before any of the worker agents begin processing one or more sub-tasks. Alternatively, the user agent 102 may communicate with the core node 104 to select a first worker agent 106a and then work with the core node 104 to select a second worker agent 106b after receiving and evaluating sub-task results received from the first worker agent 106a.

Therefore, in one embodiment, the user agent 102 receives a user request from a user and generates the embedding of the user request, directly or indirectly (for example, by transmitting the user request to the first pre-trained LLM for generation of the embedding). The core node 104 identifies a plurality of candidate worker agents 106 ranked. The user agent 102 may modify the user request to, for example, add user-specific personalization data associated with the user to the user request and/or to the embedding of the user request. Either at the direction of the user agent 102 or at the direction of the core node 104, the second pre-trained LLM 112 decomposes the modified user request into a plurality of sub-requests describing a plurality of sub-tasks. For each of the sub-tasks, the user agent 102 evaluates the identified candidate workers and identifies a subset of that plurality based on the ranking data and criterion regarding the suitability of the worker agents 106 to execute the sub-tasks and transmits an identification of a best worker agent 106 to the user agent 102. The user agent may communicate directly with the identified best worker agent 106 to have the sub-task completed.

Referring back to FIG. 2A, the system 100 may continually refine its rankings as the components of the system 100 execute over time and generate additional data from which the components may learn from the interactions, ensuring an adaptive and evolving ranking system. For example, in some embodiments, after each interaction, between a user agent 102 and a worker agent 106, the system 100 may execute an optional feedback mechanism whereby the user agent 102 may provide a rating and/or review of the performance of the worker agent 106. The core node 104 may then integrate the feedback received from the user agent 102 into the ranking system, ensuring a continuously improving and self-regulating system.

For each of the plurality of sub-tasks, the user agent provides the corresponding result to the user (212-e). The user agent 102 may aggregate the received results for each of the plurality of sub-tasks and provide the aggregated results to the user. The user agent 102, upon receiving and optionally parsing the response from the worker agent 106, may integrate response data with locally stored user data to personalize the response for the user. The user agent 102 may dynamically crafts a tailored output for the user, which may include rendering the results and/or suggesting further actions based on the response.

The following table describes one embodiment of network message types used by the agents 102 and 106 and the core node 104 to communicate amongst themselves in accordance with the distributed message queue system:

| Message Type | Sent By | Sent To | Specification | Description |
| --- | --- | --- | --- | --- |
| Connection Request | User Agents/ Worker Agents | Core Node | Message(sender_UID, core_node_ID, "CONNECTION_REQUEST", public_key) | Contains public key and UID. |
| Challenge | Core Node | Enrolling Agent | Message(core_node_ID, sender_UID, "CHALLENGE", challenge_data) | Contains a cryptographic challenge. |
| Challenge Response | Enrolling Agent | Core Node | Message(sender_UID, core_node_ID, "CHALLENGE_RESPONSE", processed_challenge) | Contains the processed challenge result. |
| Service Declaration | Worker Agents | Core Node | Message(worker_agent_ID, core_node_ID, "SERVICE_DECLARATION", service_details) | Contains details about the services they offer. |

-continued

| Message Type | Sent By | Sent To | Specification | Description |
|---|---|---|---|---|
| Acknowledgment | Core Node | Enrolling Agent | Message(core_node_ID, sender_UID, "ACK", token) | Contains a unique token and confirmation of enrollment. |
| Discovery Query | User Agent | Core Node | Message(user_agent_ID, core_node_ID, "DISCOVERY_QUERY", criteria) | Contains criteria for Worker Agent discovery. |
| Discovery Response | Core Node | User Agent | Message(core_node_ID, user_agent_ID, "DISCOVERY_RESPONSE", worker_agent_details) | Contains details of relevant Worker Agents. |
| Task Request | User Agent | Worker Agent | Message(user_agent_ID, worker_agent_ID, "TASK_REQUEST", task_details) | Contains task details and other relevant metadata. |
| Task Response | Worker Agent | User Agent | Message(worker_agent_ID, user_agent_ID, "TASK_RESPONSE", task_results) | Contains task results or status updates. |
| Ranking Query | User Agent | Core Node | Message(user_agent_ID, core_node_ID, "RANKING_QUERY", criteria) | Contains criteria for ranking Worker Agents. |
| Ranking Response | Core Node | User Agent | Message(core_node_ID, user_agent_ID, "RANKING_RESPONSE", ranked_list) | Contains a prioritized list of Worker Agents. |
| Feedback | User Agent | Core Node | Message(user_agent_ID, core_node_ID, "FEEDBACK", rating_data) | Contains ratings or reviews for a Worker Agent's performance. |
| Error | Any Agent | Relevant Agent | Message(sender_ID, recipient_ID, "ERROR", error_details) | Contains error details. |

As described above, agents may complete an enrollment process with the core node 104 as part of joining the system 100. Agents may be pre-programmed with an identification of the core node 104 and/or how to communicate with the core node 104. In some embodiments, a core node 104 is associated with (e.g., subscribed to) a type of message queue dedicated to agent-core node communications and the agents are programmed to initiate an enrollment process by sending a message to the core node at the message queue. By including functionality for enrolling agents—which may be a streamlined and secure enrollment method using a dedicated message queue system—the system 100 may provide agents (and their developers) with a standardized mechanism for adding new agents to the system 100 in a secure and traceable manner.

Figure 3A:
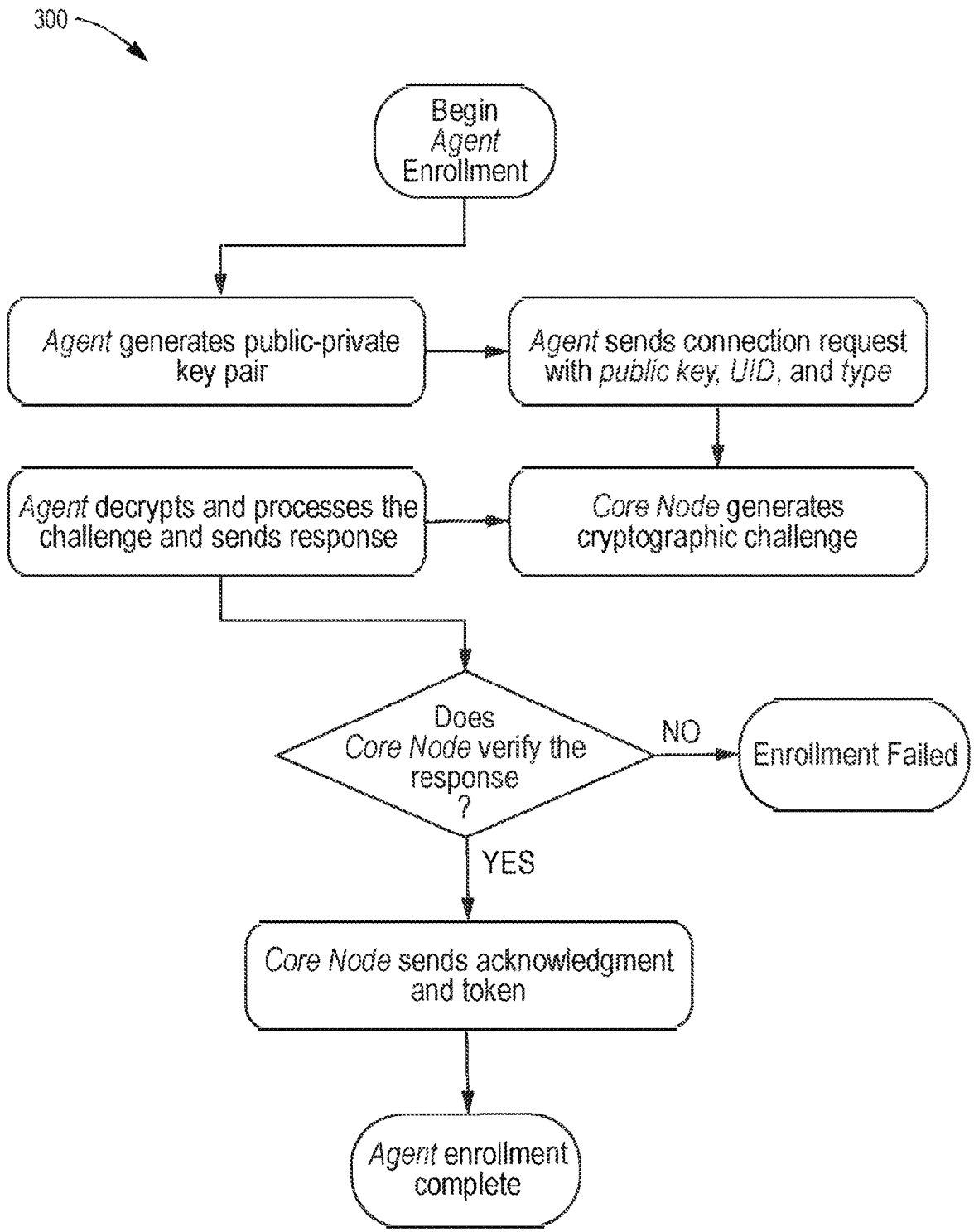
FIG. 3A is a flow diagram depicting an embodiment of a method for enrolling, by a core node, an agent in a system for query decomposition, agent ranking, and execution of selected agents from a plurality of agents.

Referring now to FIG. 3A, a workflow diagram depicts one embodiment of a method 300 for enrolling an agent. The method 300 may include a cryptographic challenge in which the agent responds to a cryptographic challenge generated by the core node 104 and the core node 104 enrolls the agent upon verifying the response received by the agent.

In some embodiments, in addition to cryptographic challenges, the core node 104 transmits additional challenges to the agents requesting enrollment. For example, the core node 104 may transmit a challenge to a user agent 102 to provide an example of how the user agent 102 would decompose a sample user request into a plurality of sub-tasks and designate one or more worker agents to each of the sub-tasks in the plurality. As another example, the core node 104 may transmit a challenge to a worker agent 106 to provide an example of how the worker agent 106 would respond to a task that the worker agent 106 has specified the worker agent 106 has the capacity (technical or logistical) to process. The core node 104 may use the agent responses to determine whether to enroll the agents.

Figure 3B:
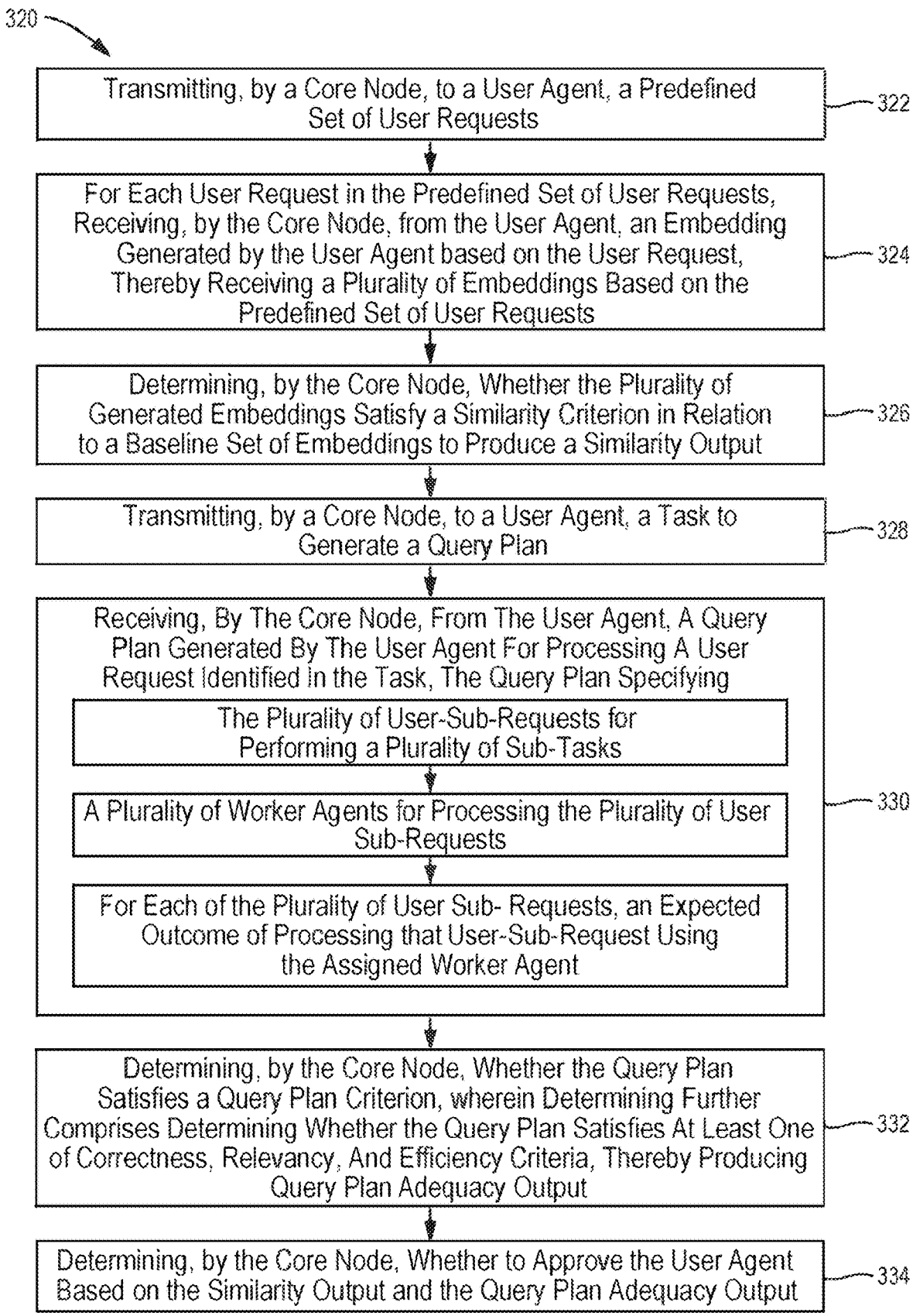
FIG. 3B is a flow diagram depicting an embodiment of a method for depicting an embodiment of a method for enrolling, by a core node, a user agent in a system for query decomposition, agent ranking, and execution of selected agents from a plurality of agents.

Referring now to FIG. 3B, a flow diagram depicts one embodiment of a method 320 for enrolling, by a core node, a user agent in the system 100. The method 320 includes transmitting, by a core node, to a user agent, a predefined set of user requests (322). The method 320 includes, for each user request in the predefined set of user requests, receiving, by the core node, from the user agent, an embedding generated by the user agent based on the user request, thereby receiving a plurality of embeddings based on the predefined set of user requests (324). The method 320 includes determining, by the core node, whether the plurality of generated embeddings satisfy a similarity criterion in relation to a baseline set of embeddings to produce a similarity output (326). The method 320 includes transmitting, by the core node, to the user agent, a task to generate a query plan (328). The method 320 includes receiving, by the core node, from the user agent, a query plan generated by the user agent for processing a user request identified in the task, the query plan specifying: a plurality of user sub-requests for performing a plurality of sub-tasks; a plurality of worker agents for processing the plurality of user sub-requests; and, for each of the plurality of user sub-requests, an expected outcome of processing that user sub-request using the assigned worker agent (330). The method 320 includes determining, by the core node, whether the query plan satisfies a query plan criterion, wherein determining further comprises determining whether the query plan satisfies at least one of correctness, relevancy, and efficiency criteria, thereby producing query plan adequacy output (332). The method 320 includes determining, by the core node, whether to approve the user agent based on the similarity output and the query plan adequacy output (334).

Upon a user agent's first interaction with the network in the system 100, the system 100 may trigger an enrollment verification protocol. The user agent 102 may generate a unique public-private key pair, identify a secure channel topic of the core node 104, and send a connection request to the core node 104 on the secure channel topic. This request may include the public key of the user agent 102 and a unique identifier (UID) of the user agent 102. The core node 104 may generate a unique cryptographic challenge for the user agent 102 using the provided public key and send the challenge to the user agent 102. The user agent 102 may decrypt the challenge using its generated private key, process the challenge (e.g., compute a cryptographic hash) and transmit the result of processing the challenge back to the core node 104, which may then verify the response.

Referring now to FIG. 3B in greater detail, and in connection with FIGS. 1A-3A, the method 320 includes transmitting, by a core node, to a user agent, a predefined set of user requests (322). The core node 104 may determine to transmit the predefined set of user requests to the user agent 102 subsequent to verifying the response to the cryptographic challenge.

The method 320 includes, for each user request in the predefined set of user requests, receiving, by the core node, from the user agent, an embedding generated by the user agent based on the user request, thereby receiving a plurality of embeddings based on the predefined set of user requests (324). As will be understood by those of skill in the art, embeddings may be high-dimensional feature vectors representing a context and semantic content of input to be processed by one or more machine learning components.

The method 320 includes determining, by the core node, whether the plurality of generated embeddings satisfy a similarity criterion in relation to a baseline set of embeddings to produce a similarity output (326).

The method 320 includes transmitting, by the core node, to the user agent, a task to generate a query plan (328).

The method 320 includes receiving, by the core node, from the user agent, a query plan generated by the user agent for processing a user request identified in the task, the query plan specifying: a plurality of user sub-requests for performing a plurality of sub-tasks; a plurality of worker agents for processing the plurality of user sub-requests; and, for each of the plurality of user sub-requests, an expected outcome of processing that user sub-request using the assigned worker agent (330).

The method 320 includes determining, by the core node, whether the query plan satisfies a query plan criterion, wherein determining further comprises determining whether the query plan satisfies at least one of correctness, relevancy, and efficiency criteria, thereby producing query plan adequacy output (332). The core node 104 may cross-verify the generated query plan with standard benchmarks or predefined templates to ascertain the correctness, relevancy, and efficiency of the proposed plan. The core node 104 may determine a percentage of times that the generated query plan exactly matches the optimal or annotated plan (Exact Match) and the percentage of times the correct plan appears within the top-k predicted plans (Top K accuracy). A plan is considered exact if it has a similar number of sub-tasks and the sub-tasks are similar in the embedding space beyond a set threshold.

The method 320 includes determining, by the core node, whether to approve the user agent based on the similarity output and the query plan adequacy output (334).

If the response is correct, the core node 104 may add the user agent UID and public key to a directory of approved agent and send the user agent 102 an acknowledgement message along with a unique token for use in subsequent authentication processes.

Figure 3C:
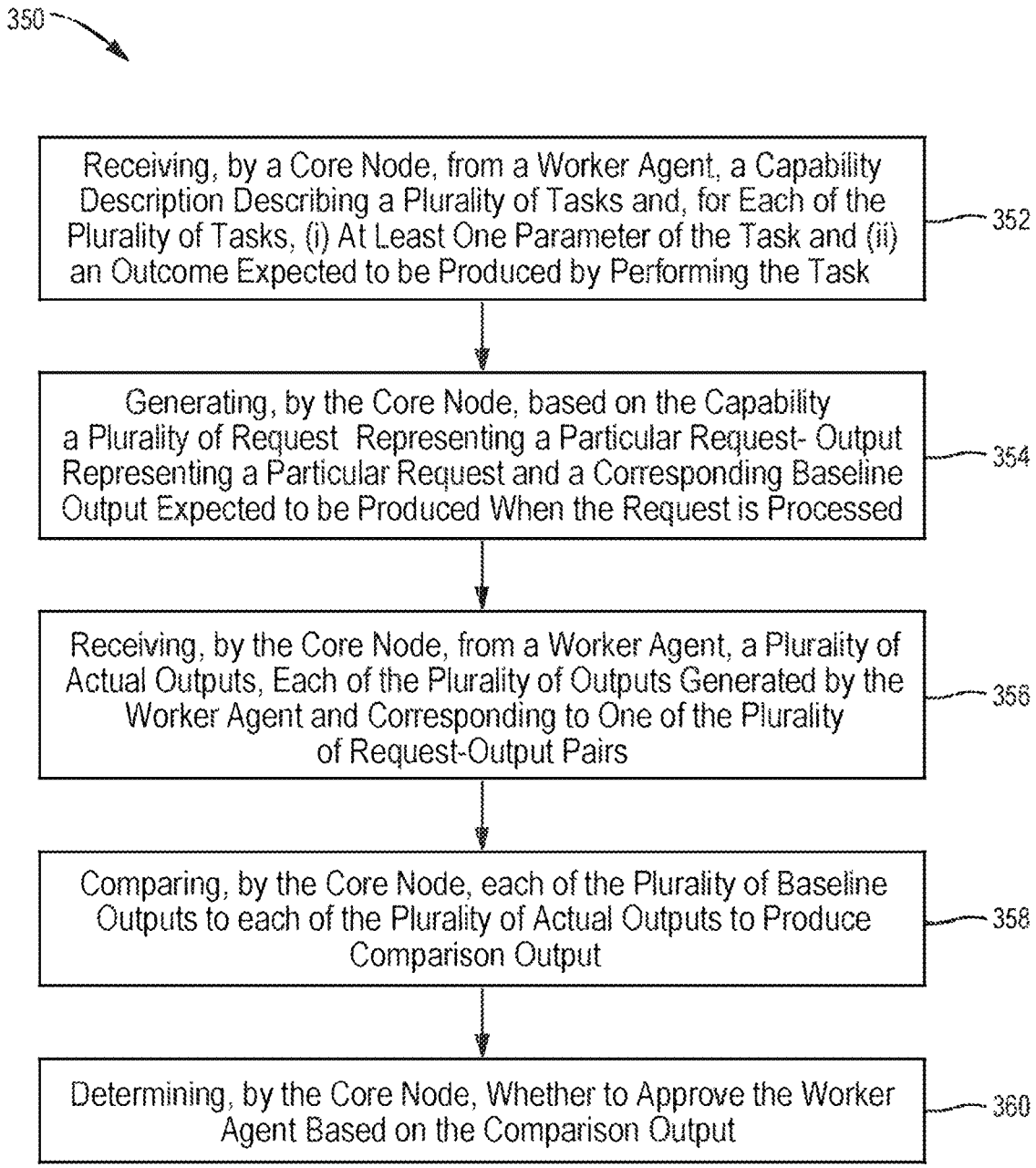
FIG. 3C is a flow diagram depicting an embodiment of a method for depicting an embodiment of a method for enrolling, by a core node, a worker agent in a system for query decomposition, agent ranking, and execution of selected agents from a plurality of agents.
Figure 3D:
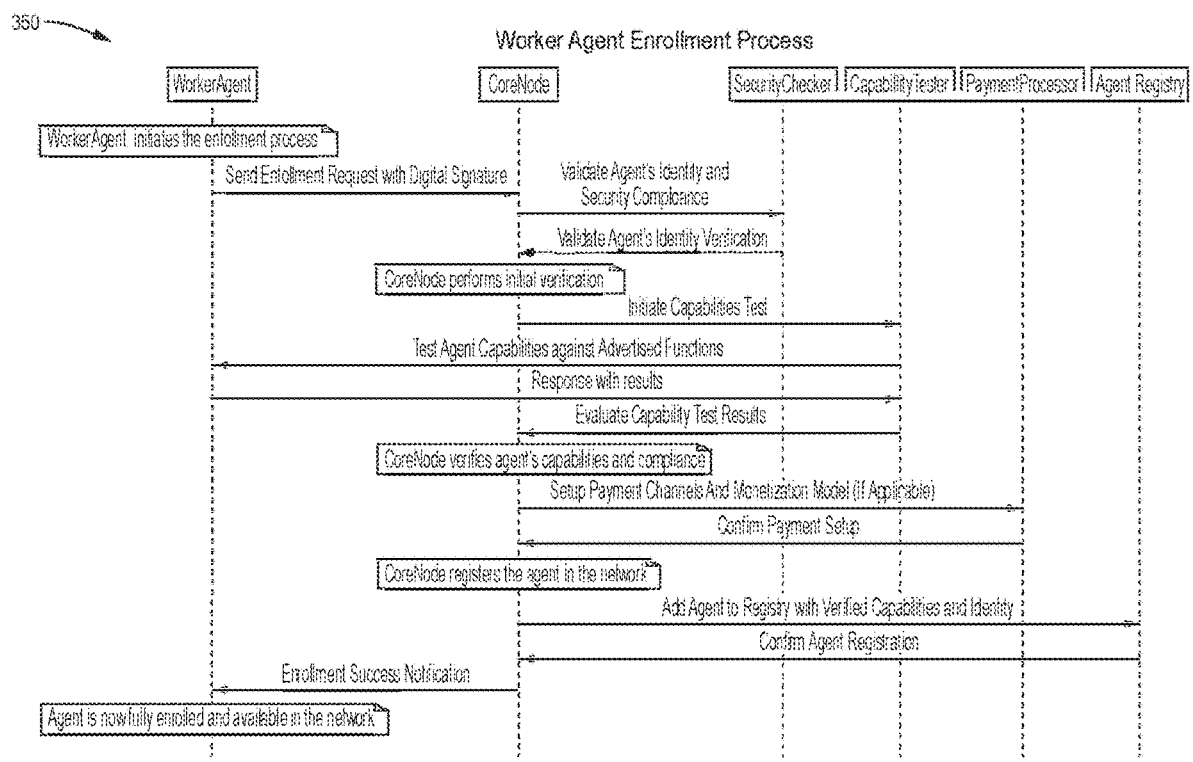
FIG. 3D is a flow diagram depicting an embodiment of a method for depicting an embodiment of a method for enrolling, by a core node, a worker agent in a system for query decomposition, agent ranking, and execution of selected agents from a plurality of agents.

Referring now to FIG. 3C, a flow diagram depicts one embodiment of a method 350 for enrolling, by a core node, a worker agent in the system 100. The method 350 includes receiving, by a core node, from a worker agent, a capability description describing a plurality of tasks and, for each of the plurality of tasks, (i) at least one parameter of the task and (ii) an outcome expected to be produced by performing the task (352). The method 350 includes generating, based on the capability description, a plurality of request-output pairs, each representing a particular request and a corresponding baseline output expected to be produced when the request is processed (354). The method 350 includes receiving, by the core node, from the worker agent, a plurality of outputs, each of the plurality of outputs generated by the worker agent and corresponding to one of the plurality of request-output pairs (356). The method 350 includes comparing, by the core node, the plurality of baseline outputs to the plurality of actual outputs to produce comparison output (358). The method 350 includes determining whether to approve the worker agent based on the comparison output (360).

In embodiment in which the agent is a worker agent 106 is the enrollment challenge can be extended to test the validity of a claim by the worker agent to be able to perform one or more functions. As with the user agent 102, the worker agent 106 may generate a unique public-private key pair, identify a secure channel topic of the core node 104, and send a connection request to the core node 104 on the secure channel topic. Along with the public key of the worker agent 106 and the UID of the worker agent 106, the worker agent 106 may include a description of one or more services the worker agent 106 provides. The core node 104 may execute the cryptographic challenge as described above for the user agent 102 and may also require a demonstration of a service identified in the description of services that the worker agent 106 provided.

Referring now to FIG. 3C in greater detail, and in connection with FIGS. 1A-3B, the method 320 includes receiving, by a core node, from a worker agent, a capability description describing a plurality of tasks and, for each of the plurality of tasks, (i) at least one parameter of the task and (ii) an outcome expected to be produced by performing the task (352). The worker agent 106 may provide a detailed capability description outlining the types of tasks it can handle, parameters it requires, and expected outcomes.

The method 350 includes generating, based on the capability description, a plurality of request-output pairs, each representing a particular request and a corresponding baseline output expected to be produced when the request is processed (354). The core node 104 may execute a verification algorithm to generate the request-output pairs, designed to test various aspects of the declared capabilities.

The method 350 includes receiving, by the core node, from the worker agent, a plurality of outputs, each of the plurality of outputs generated by the worker agent and corresponding to one of the plurality of request-output pairs (356).

The method 350 includes comparing, by the core node, the plurality of baseline outputs to the plurality of actual outputs to produce comparison output (358). The comparison may include an accuracy check to ensure that the response meets the accuracy as described in the capability document. The comparison may include a consistency check to verify that similar or repeated queries yield consistent results. The comparison may include an assessment of response time and resource utilization to match one or more agent claims. Initial responses may be subjected to automated checks for correctness, format conformity, and/or precision. For responses that require more subjective analysis, domain experts provide qualitative assessments of the suitability and/or thoroughness of the worker agent's responses. Discrepancies or performance issues identified during this phase are fed back to the owner of the worker agent for corrective measures, ensuring continuous improvement.

The method 350 includes determining whether to approve the worker agent based on the comparison output (360). Upon verification that the worker agent 106 satisfies a threshold level of performance for the identified service, the core node 104 may add the worker agent UID and public key to the directory of approved agents and send the worker agent 106 the acknowledgement message along with a unique token.

In some embodiments, the core node 104 provisionally accepts the worker agent 106 and sets a period of time in which the worker agent 106 is in a trial mode, during which time the core node 104 monitors communications from the worker agent 106 and confirms that one or more services provided by the worker agent 106 satisfies the threshold level of performance and that the services offered by the worker agent 106 align with the capabilities declared by the worker agent 106. Therefore, the core node 104 may determine to provisionally approve the worker agent and transmit to the worker agent an identification of a period of time for which the worker agent is provisionally approved.

Referring back to FIG. 2A, as indicated above, the method 200 includes ranking, by the core node, the plurality of candidate worker agents based on the embedding of the user request (as described above at 206) and then ranking a subset of the candidate worker agents based on at least one criterion (as described above at 212). In some embodiments, the core node 104 executes an agent-specific ranking algorithm for ranking a plurality of candidate worker agents based on user requests and upon specific attributes of each of the worker agents 106.

Figure 4:
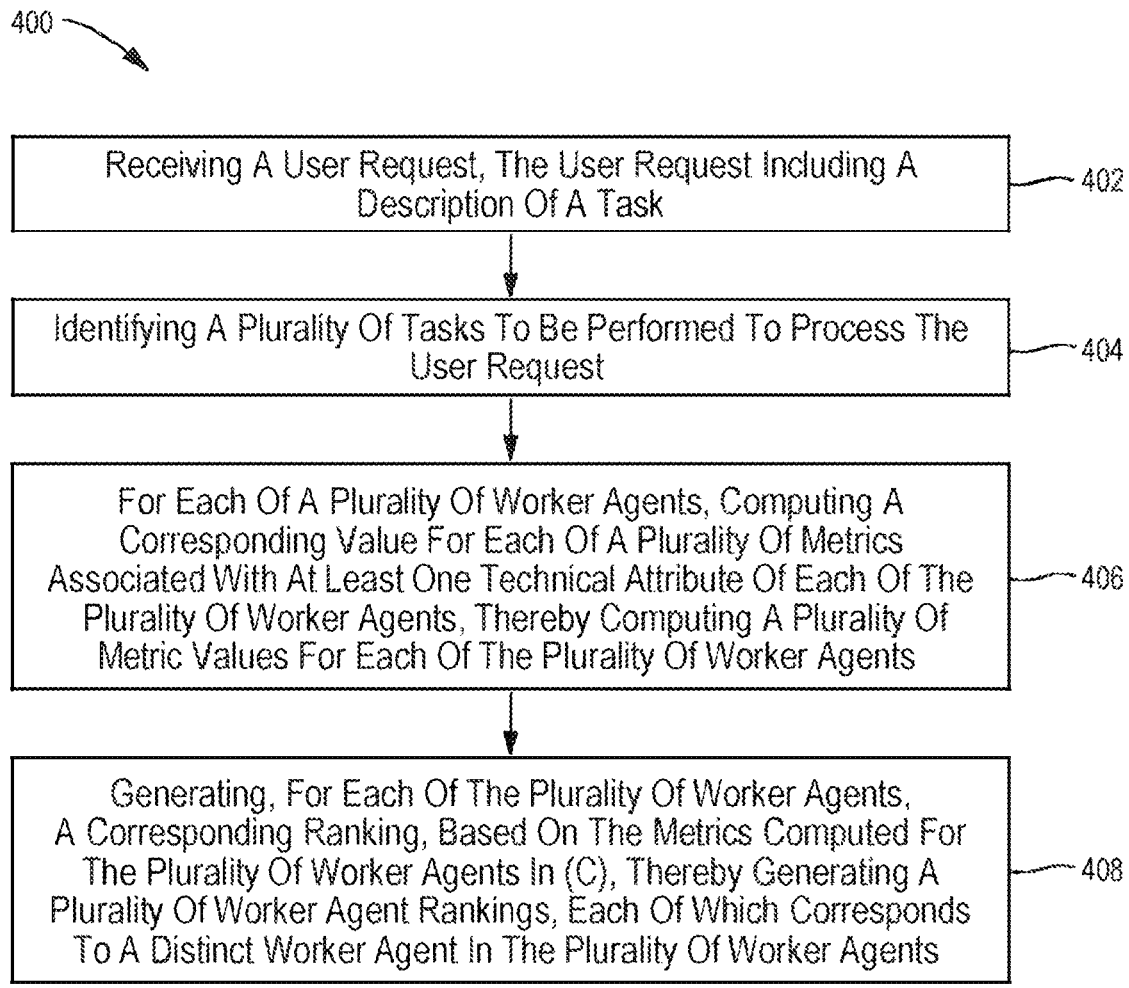
FIG. 4 is a flow diagram depicting one embodiment of a method for executing an agent-specific ranking algorithm to rank a plurality of worker agents in a system for query decomposition, agent ranking, and execution of selected agents from a plurality of agents.

Referring now to FIG. 4, a flow diagram depicts one embodiment of a method for executing, by a core node, an agent-specific ranking algorithm to rank a plurality of worker agents based upon worker agent attributes and upon user request attributes in a system 100. The method 400 includes receiving a user request, the user request including a description of a task (402). The method 400 includes identifying a plurality of tasks to be performed to process the user request (404). The method 400 includes for each of a plurality of worker agents, computing a corresponding value for each of a plurality of metrics associated with at least one technical attribute of each of the plurality of worker agents, thereby computing a plurality of metric values for each of the plurality of worker agents (406). The method 400 includes generating, for each of the plurality of worker agents, a corresponding ranking, based on the metrics computed for the plurality of worker agents in (C), thereby generating a plurality of worker agent rankings, each of which corresponds to a distinct worker agent in the plurality of worker agents (408).

Referring now to FIG. 4 in greater detail and in connection with FIGS. 1A-3D, the method 400 includes receiving a user request, the user request including a description of a task (402). The user agent 102 may receive the user request. The user agent 102 may receive the user request as described above in connection with FIGS. 2A-2C.

The method 400 includes identifying a plurality of tasks to be performed to process the user request (404). The user agent 102 may identify the plurality of tasks. The user agent 102 may identify the plurality of tasks as described above in connection with FIGS. 2A-2C. The user agent 102 may transmit a request to the core node 104 for ranking of a plurality of worker agents 106.

The method 400 includes for each of a plurality of worker agents, computing a corresponding value for each of a plurality of metrics associated with at least one technical attribute of each of the plurality of worker agents, thereby computing a plurality of metric values for each of the plurality of worker agents (406). The core node 104 may execute a collaborative filtering method modified to rank at least one attribute of a worker agents, the worker agent executing at least one large language model; the collaborative filtering model may use both qualitative and quantitative metrics to perform the ranking.

The core node 104 may compute, for each worker agent W in the plurality of worker agents, a value of a throughput metric for the worker agent W, based on processing of other user requests by the worker agent W. The core node 104 may continuously monitor and log a number of tokens processed per second by each worker agent during their operational periods and utilize statistical methods to calculate the average throughput for each agent. Lower throughput agents are deprioritized, ensuring faster agents are more readily available for high-performance tasks.

The core node 104 may compute, for each worker agent W in the plurality of worker agents, a value of a context window matching metric for the worker agent W, based on a maximum context window of the worker agent W and a minimum context window required to process the user request. As will be understood by those of skill in the art, a context window may refer to an amount of text that a language model may receive as input when generating or parsing language; as an example, without limitation, a context window may specify a number of tokenized data terms that a language model can process. The core node 104 may profile each worker agent 106 on its maximum context window capability, allowing differentiations to be made based on the complexity of tasks they can support. For tasks requiring larger context windows, the core node 104 may prioritize agents that provide these capabilities, ensuring complex queries are handled by the most suitable agents.

The core node 104 may compute, for each worker agent W in the plurality of worker agents, a value of an operational cost metric for the worker agent W, based on processing of other user requests by the worker agent W. The core node 104 may record an operational cost of each worker agent 106 on a per-million-token basis. The core node 104 may therefore rank worker agents not solely on performance but also on the cost-effectiveness of operations, providing a balanced rank considering high-performing and cost-efficient agents favorably in budget-sensitive scenarios.

The core node 104 may compute, for each worker agent W in the plurality of worker agents, a value of a declared capabilities metric for the worker agent W, based on declared capabilities of the worker agent W and tasks required to be performed to process the user request. The core node 104 may annotate worker agent profiles with their declared capabilities (e.g., general knowledge, specialized domains such as legal advice, medical information, etc.) and implement a matching algorithm that gives preference to agents whose declared capabilities align closely with the specific needs voiced in a user's query, thus yielding more accurate and relevant responses.

The core node 104 may compute, for each worker agent W in the plurality of worker agents, a value of a reliability score metric for the worker agent W, based on uptime and longevity of the worker agent W. The core node 104 may monitor uptime (availability) and age (longevity in the network) to gauge the reliability of each worker agent 106. The core node 104 may rank agents higher that have demonstrated consistent uptime and longevity, assuming these agents are more stable and trustworthy.

The core node 104 may compute, for each worker agent W in the plurality of worker agents, a value of a success rate metric for the worker agent W, based on tasks performed by the user agent W. The core node 104 may track conversation histories to maintain a log of user feedback and success rates for completed tasks. The core node 104 may utilize natural language processing techniques (including, by way of example, sentiment analysis) to analyze user feedback, quantifying satisfaction and success rates. The core node 104 may establish a scoring system that incorporates this user feedback, adjusting ranks to favor agents with higher satisfaction scores.

The core node 104 may execute a collaborative filtering engine that integrates one or more determined scores for one or more metrics to generate a composite score for each worker agent 106. The core node 104 may employ data fusion techniques to amalgamate disparate data sources (quantitative measures like throughput and qualitative feedback) into a single coherent ranking framework.

The method 400 includes generating, for each of the plurality of worker agents, a corresponding ranking, based on the metrics computed for the plurality of worker agents in (C), thereby generating a plurality of worker agent rankings, each of which corresponds to a distinct worker agent in the plurality of worker agents (408).

The core node 104 may implement a real-time updating mechanism that recalibrates the rankings dynamically as the system 100 receives new data points (e.g., recent performance metrics, latest user feedback). The core node 104 may integrate one or more machine learning algorithms to continually refine the collaborative filtering model, making it more accurate and adaptive over time.

This multifaceted implementation ensures that the ranking of worker agents is both comprehensive and adaptive, considering a multitude of performance and reliability factors to ensure optimal user experience with LLM interactions.

Referring back to FIG. 2A, as indicated above, the method 200 includes identifying, by a core node, a plurality of candidate worker agents in a plurality of clusters of worker agents, based on the embedding of the user request (as described above at 204) and identifying, by the core node, to the user agent, from the subset of the plurality of candidate worker agents, based on at least one criterion, a best worker agent to perform the sub-task (as described above at 212-b). In some embodiments, the core node 104 executes a method for semantic categorization of agents in a system 100 and uses the output of the method to cluster the agents, which improves the process of identifying candidate worker agents for user request completion and the process of identifying the best worker agents to execute particular sub-tasks of the user requests.

In some embodiments, when a user agent 102 queries the core node 104 for available worker agents 106, as the network grows, sending the user agent 102 an identification of all worker agents 106 for every query might be sub-optimal and may increase the performance expectation of the user agent 102; therefore, execution of a method for semantic categorization of agents enables the core node 104 to identify to the user agent 102 those available worker agents 106 that are associated with types of sub-tasks and/or user requests relevant to the user agent 102. By executing such a method, the core node 104 is enabled to ensure that a worker agent 106 identified to the user agent 102 is available to perform identified types of tasks, that the worker agent has not drifted dramatically from its defined capabilities, and—by clustering worker agents with similar semantic capabilities together—to ensure that for a user request, the core node 104 only returns identifications of relevant worker agents 106.

Figure 5:
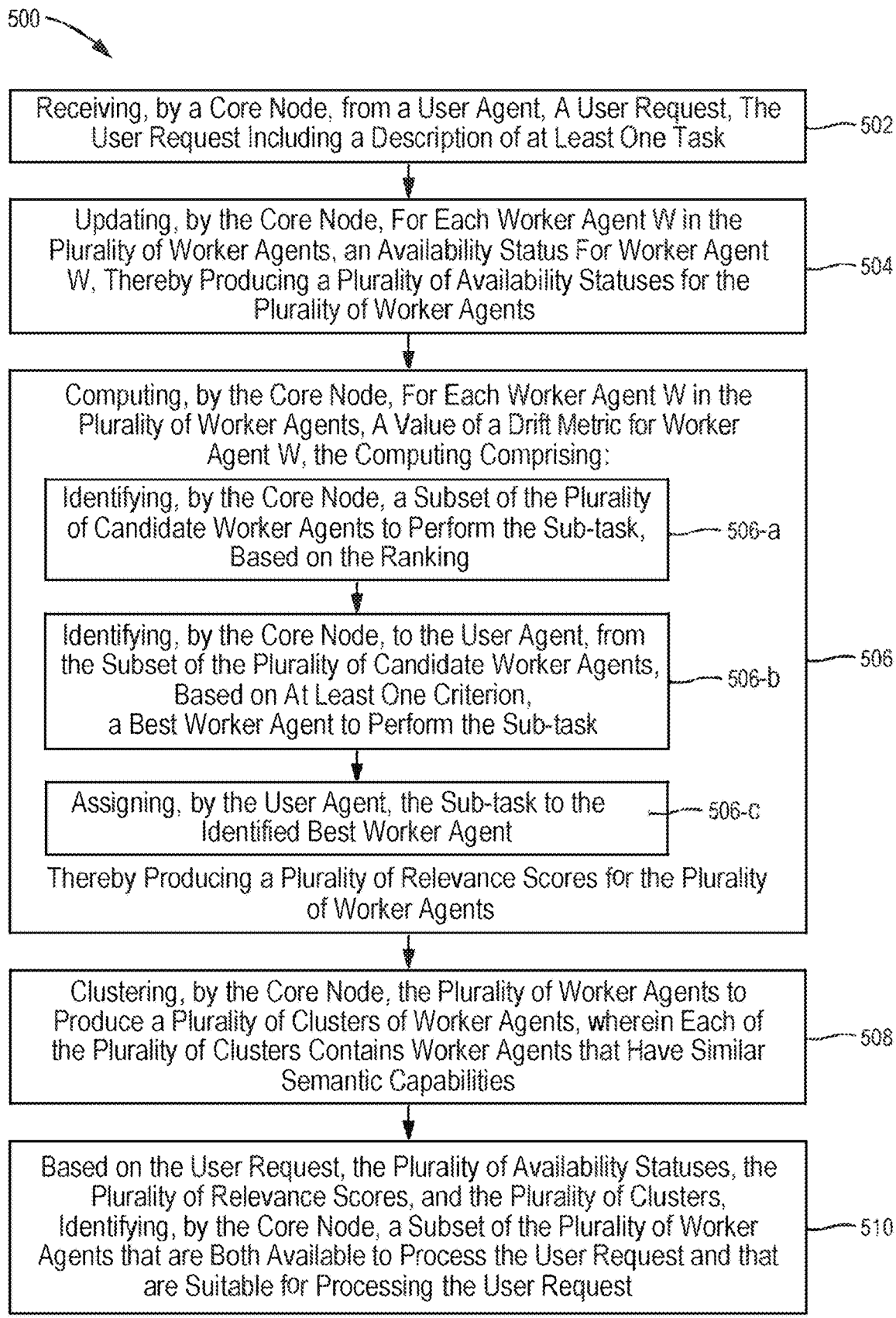
FIG. 5 is a flow diagram depicting one embodiment of a method for semantic categorization of agents in a system for query decomposition, agent ranking, and execution of selected agents from a plurality of agents.

Referring now to FIG. 5, a flow diagram depicts one embodiment of a method 500 for semantic categorization of agents in a system 100. The method 500 for identifying and clustering worker agents suitable for processing a user request includes receiving, by a core node, from a user agent, a user request, the user request including a description of at least task (502). The method 500 includes updating, by the core node, for each worker agent W in the plurality of worker agents, an availability status for the worker agent W, thereby producing a plurality of availability statuses for the plurality of worker agents (504). The method 500 includes computing, by the core node, for each worker agent W in the plurality of worker agents, a value of a drift metric for the worker agent W, the computing comprising computing, for the worker agent W, a relevance score representing a relevance of a plurality of responses provided by the worker agent W to a plurality of user requests; thereby computing a plurality of relevance scores for the plurality of worker agents (506-a); computing the value of the drift metric for the worker agent W based on the relevance score for the worker agent W (506-b); and updating the availability status of the worker agent W to the "unavailable" status if the value of the drift metric for the worker agent W satisfies a predetermined criterion (506-c). The method 500 includes thereby computing a plurality of relevance scores for the plurality of worker agents (506). The method 500 includes clustering, by the core node, the plurality of worker agents to produce a plurality of clusters of worker agents, wherein each of the plurality of clusters contains worker agents that have similar semantic capabilities (508). The method 500 includes, based on the user request, the plurality of availability statuses, the plurality of relevance scores, and the plurality of clusters, identifying, by the core node, a subset of the plurality of worker agents that are both available to process the user request and that are suitable for processing the user request (510). By executing the method 500, therefore, the core node 104 may generate, maintain, and distribute identifications of worker agents 106 that include updated status indicators for each identified worker agent as well as an identification of a category of queries each worker agent can support.

Upon enrolling a worker node 106 into the system 100, the core node 104 assigns each enrolled worker node 106 a unique identifier; the worker node 106 is programmed to send heartbeat signals at regular intervals. The core node 104 may continuously monitor for incoming heartbeat signals. On receiving a heartbeat, the core node updates the agent's status to "available" in its directory. If no heartbeat is received within the specified interval, the agent's status is updated to "unavailable." If an agent fails to send heartbeats over multiple intervals, the owner of the agent is notified for further investigation.

Referring now to FIG. 5 in greater detail and in connection with FIGS. 1A-4, the method 500 for identifying and clustering worker agents suitable for processing a user request includes receiving, by a core node, from a user agent, a user request, the user request including a description of at least task (502).

The method 500 includes updating, by the core node, for each worker agent W in the plurality of worker agents, an availability status for the worker agent W, thereby producing a plurality of availability statuses for the plurality of worker agents (504). To ensure worker agents 106 are available, the system 100 may implement a heartbeat mechanism, where each worker agent 106 sends periodic signals ("heartbeats") to the core node 104. These signals contain basic information such as a timestamp, agent ID, and status messages. Updating the availability status may include, in response to receiving a heartbeat signal from the worker agent W, updating the availability status of worker agent W to an "available" status. Updating the availability status may include, in response to not receiving any heartbeat signal from the worker agent W within a time interval of a predetermined duration, updating the availability status of worker agent W to an "unavailable" status. The absence of a heartbeat signal within a predefined time interval is interpreted as the worker agent 106 being unavailable; upon determining that the predetermined time interval has passed without receipt of a heartbeat signal from a worker agent 106, the core node 104 will update the agent's status to "unavailable" and refrain from assigning tasks to that worker agent 106 either directly or indirectly (e.g., by refraining from identifying the worker agent 106 with the unavailable status to a user agent 102).

The method 500 includes computing, by the core node, for each worker agent W in the plurality of worker agents, a value of a drift metric for the worker agent W, the computing comprising computing, for the worker agent W, a relevance score representing a relevance of a plurality of responses provided by the worker agent W to a plurality of user requests, thereby computing a plurality of relevance scores for the plurality of worker agents (506-*a*); computing the value of the drift metric for the worker agent W based on the relevance score for the worker agent W (506-*b*); and updating the availability status of the worker agent W to the "unavailable" status if the value of the drift metric for the worker agent W satisfies a predetermined criterion (506-*c*). The method 500 includes thereby computing a plurality of relevance scores for the plurality of worker agents (506). Therefore, to manage and detect drift in worker agents 106, the core node 104 may execute or be in communication with a machine learning monitoring system tracking each worker agent 106's responses to user requests and/or sub-tasks of user requests, ensuring that the responses remain relevant to the worker agent's originally defined capabilities by, for example, logging positive feedback on responses and conducting periodic tests. When a user provides positive feedback on a worker agent's response, the system 100 log the user request and/or sub-task of the user request and its resulting response. At pre-configured intervals, the core node 104 may re-execute at least one of the logged user requests and/or sub-task of the user request on the worker agent 106 that originally generated the response. The core node 104 compares current responses to historically positive responses using metrics such as, without limitation, accuracy, precision, and semantic similarity. Significant changes or performance drops are flagged. The status of the worker agent 106 is updated to indicate potential drift, and an owner of the worker agent 106 may be notified. If consistent drift is detected and not corrected, the agent's status is changed to "unavailable," preventing it from being assigned new queries.

The method 500 includes clustering, by the core node, the plurality of worker agents to produce a plurality of clusters of worker agents, wherein each of the plurality of clusters contains worker agents that have similar semantic capabilities (508). To provide user agents 102 with identifications of the most relevant worker agents 106, the core node 104 may leverage language models (LLMs) and embedding techniques to cluster worker agents 106 based on their semantic capabilities. Each worker agent's defined capabilities (provided to the core node 104 during the enrollment process) are converted into embeddings using a pre-trained LLM. These embeddings are then clustered using algorithms such as k-means, hierarchical clustering, or other suitable methods. Clusters are recalculated periodically or when new worker agents 106 are added, ensuring the most accurate grouping. When a user agent 102 queries the core node 104, the user query is also embedded using the same LLM. The query embedding is compared to cluster centroids to select the most relevant clusters. Within the selected clusters, available worker agents 106 are then shortlisted and returned to the user agent 102. By employing these methods, the system 100 ensures efficient, reliable, and relevant worker agent selection, maintaining high performance and user satisfaction even as the underlying network scales.

The method 500 includes based on the user request, the plurality of availability statuses, the plurality of relevance scores, and the plurality of clusters, identifying, by the core node, a subset of the plurality of worker agents that are both available to process the user request and that are suitable for processing the user request (510). The core node 104 may transmit the identification of each of the worker agents in the subset of the plurality of worker agents to the user agent.

As indicated above in connection with FIG. 2A and (212-*c*), the user agent 102 may assign each of a plurality of sub-tasks to a plurality of worker agents identified to the user agent 102 by the core node 104. In some embodiments, and as described in greater detail in connection with FIG. 6, after execution of a first sub-task by a first worker agent 106*a* and to improve the execution of a second sub-task by a second worker agent 106*b*, the user agent 102 may execute a method for context threading across agents. In these embodiments, the user agent 102 may extract context information from a first response received from the first worker agent 106*a* and enhance a description of the second sub-task to include the extracted content information.

Figure 6:
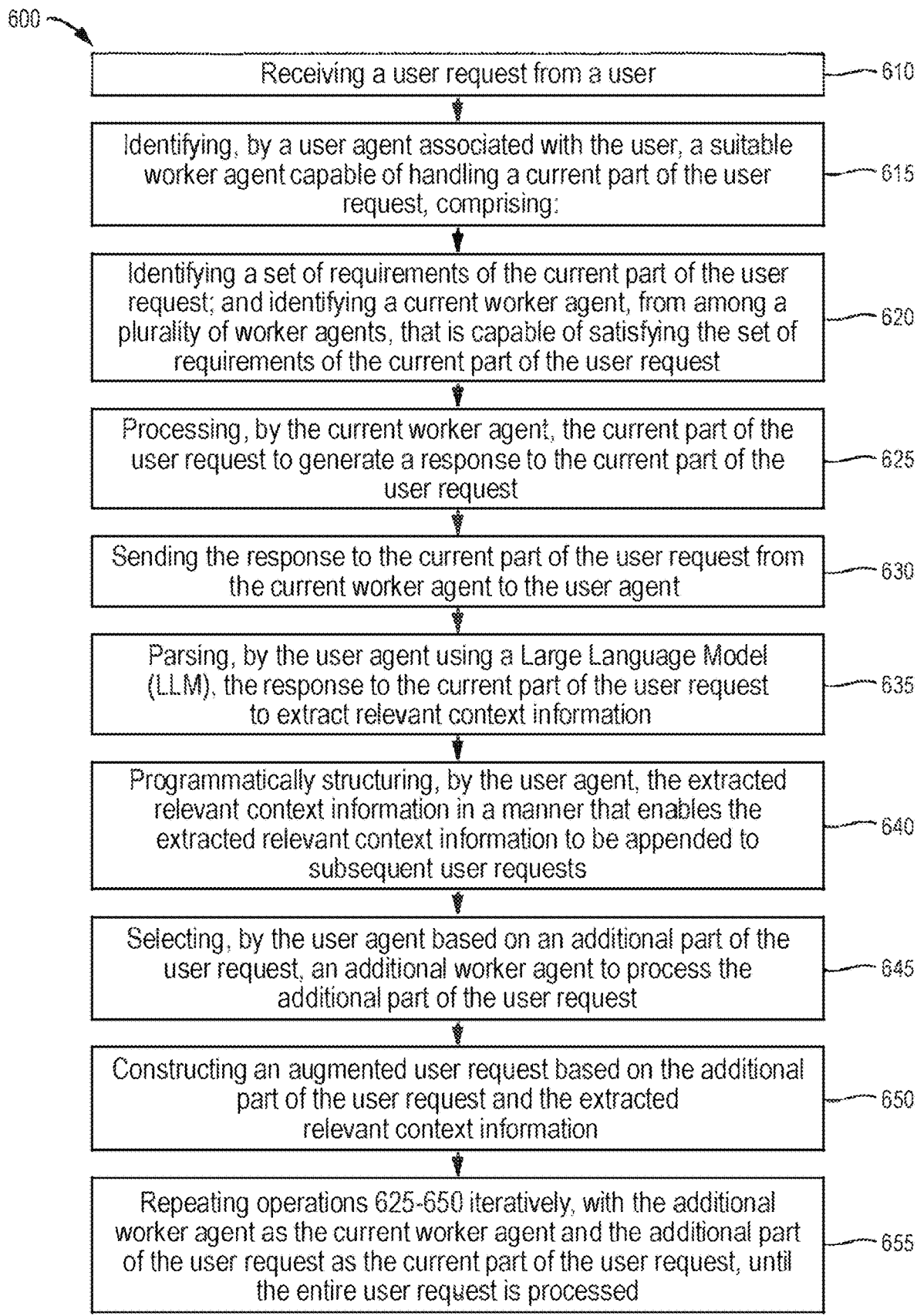
FIG. 6 is a flow diagram depicting one embodiment of a method for enhancing a context for use in processing at least one sub-task within a user request in a system for query decomposition, agent ranking, and execution of selected agents from a plurality of agents.

Referring now to FIG. 6, a method 600 for enhancing a context for use in processing at least one sub-task within a user request includes (A) receiving a user request from a user (610); (B) identifying, by a user agent associated with the user ("the current user agent"), a suitable worker agent capable of handling a current part of the user request, including (615): (B)(1) identifying a set of requirements of the current part of the user request; and (B)(2) identifying a current worker agent, from among a plurality of worker agents, that is capable of satisfying the set of requirements of the current part of the user request (620); (C) processing, by the current worker agent, the current part of the user request to generate a response to the current part of the user request (625); (D) sending the response to the current part of the user request from the current worker agent to the user agent (630); (E) parsing, by the user agent using a Large Language Model (LLM), the response to the current part of the user request to extract relevant context information (635); (F) programmatically structuring, by the user agent, the extracted relevant context information in a manner that enables the extracted relevant context information to be appended to subsequent user requests (640); (G) selecting, by the user agent based on an additional part of the user request, an additional worker agent to process the additional part of the user request (645); (H) constructing an augmented user request based on the additional part of the user request and the extracted relevant context information (650); and (I) repeating steps (C) through (H) iteratively, with the additional worker agent as the current worker agent and the additional part of the user request as the current part of the user request, until the entire user request is processed (655).

Before describing the method 600 of FIG. 6 in more detail, certain high-level features of the method 600 will be described. One technical challenge addressed by the method 600 of FIG. 6 is how to enable context from the response generated by a first one of the worker agents 106 to be passed to a second one of the worker agents 106 without needing to repeat the work performed by the first one of the worker agents 106 and without requiring worker agents to communicate directly with each other. The context threading ability of the method 600 of FIG. 6 provides a solution to these technical challenges that leverages the orchestration capabilities of the user agents 102 and processing performed by a machine learning model (e.g., an LLM) to ensure seamless hand-off and context preservation between different worker agents.

By implementing this approach, the method 600 may achieve efficient context threading across worker agents while maintaining the stateless nature of those worker agents. For example, a user agent may act as an intermediary, extracting and preserving relevant context information from each worker agent's response, then integrating this context into subsequent queries for other worker agents. This method eliminates the need for direct inter-agent communication among worker agents and prevents redundant work, as each worker agent can build upon the context provided from previous interactions without having to re-process or re-compute information.

The context threading ability of the method 600 of FIG. 6 also enables a chain of context preservation throughout the processing of a multi-faceted user request. It allows for the dynamic and intelligent augmentation of sub-requests with relevant context, ensuring that each worker agent in the sequence has access to the necessary information from previous steps without compromising the system's scalability or the independence of individual worker agents.

Returning now to FIG. 6, certain embodiments of the method 600 will now be described in more detail. The method 600 includes receiving a user request (also referred to herein as a query, such as a prompt) from a user (602). For purposes of the following discussion, assume that the user request is received from the user associated with user agent 102*a*, although the user request may be received from any user. The user request may take any of the forms disclosed herein.

As will be described in more detail below, the method 600 may perform various operations on each of a plurality of parts of the user request. For example, the method 600 may identify a first part of the user request, which may consist of less than all of the user request (e.g., some, but not all of the characters or words in the user request). Such identification may, for example, be performed by the user agent associated with the user who provided the user request (e.g., user agent 102*a*). This first part then plays the role of the "current part" of the user request in the following description.

The method 600 identifies an appropriate one of the worker agents 106 that is capable of handling the current part of the user request (615). This agent is referred to as "the current worker agent" in the following description. The method 600 may identify the current worker agent in any of a variety of ways, such as by using the core node 104 to identify the worker agent in any of the ways disclosed herein, such as in any of the ways disclosed herein in connection with the method 500 of FIG. 5.

For example, identifying the current worker agent may include: (1) identifying a set of requirements of the current part of the user request; and (2) identifying as the current worker agent, from among a plurality of worker agents (e.g., the worker agents 106), a worker agent that is capable of satisfying the set of requirements of the current part of the user request (620).

The method 600 (e.g., the core node 104) may identify the set of requirements of the current part of the user request in various ways, such as by using any one or more of the following in any combination: (1) Using Natural Language Processing (NLP) techniques to analyze the semantic content of the current part of the user request, extracting key entities, intents, and relationships that define the requirements; (2) Converting the current part of the user request into an embedding using a pre-trained Large Language Model (LLM), and using that embedding to identify the semantic characteristics and requirements of the current part of the user request; (3) Employing a machine learning model trained to classify user requests into predefined categories of tasks, each associated with a set of requirements, to identify the set of requirements of the current part of the user request; (4) Implementing rule-based systems that identify specific keywords, phrases, or patterns in the current part of the user request to determine its requirements; (5) Analyzing the context of the current part of the user request within the overall user request, including any previous interactions or user history, to infer implicit requirements.

The method 600 may identify, as the current worker agent, a worker agent that is capable of satisfying the set of requirements of the current part of the user request in any of a variety of ways, such as by using the core node 104 to identify the current worker agent in any of the ways disclosed herein in connection with the method 500 of FIG. 5.

The current worker agent may process the current part of the user request to generate a response to the current part of the user request in any of a variety of ways, such as by using any one or more of the following in any combination: (1) The current worker agent may process the current part of the user request to generate a response in various ways, utilizing different technologies and services: (1) Using NLP techniques to understand and interpret the current part of the user request, extracting key information and intent, such as by using technologies such as BERT, GPT, or other transformer-based models; (2) Utilizing one or more pre-trained or custom machine learning models to process specific types of requests, such as one or more classification models, regression models, or deep learning models; (3) Using rule-based systems or decision trees to determine the appropriate response based on predefined criteria; (4) Utilizing knowledge graph technology to represent and query relationships between entities. Examples of products/services that the current worker agent may use to process the current part of the user request to generate a response to the current part of the user request include any one or more of the following in any combination: (1) IBM Watson for natural language processing and machine learning tasks; (2) Google Cloud AI Platform for building and deploying machine learning models; (3) Amazon Comprehend for natural language processing and text analysis; (4) Microsoft Azure Cognitive Services for various AI capabilities including vision, speech, and language processing; (5) Any of OpenAI's GPT models for advanced language understanding and generation; (6) TensorFlow or PyTorch for building and training custom machine learning models; (7) Elasticsearch for powerful search and analytics capabilities.

Note that the response to the current part of the user request may only address a portion of the entire user request, and thereby represent the result of performing only a portion of the entire task described by the entire user request.

The method 600 may send the response to the current part of the user request from the current worker agent to the current user agent (630) in any of a variety of ways, such as one or more of the following in any combination: (1) Utilizing a distributed message-queueing system for communication between the current worker agent and the current user agent; (2) The current worker agent may send the response directly to the current user agent through a network connection, using a protocol such as HTTP, HTTPS, or WebSocket for real-time bidirectional communication; (3) The worker agent may send the response to the core node 104, which then forwards it to the current user agent; (4) The current worker agent may use an asynchronous communication method, such as callbacks or promises, to send the response when it is ready, without blocking other operations; (5) The method 600 may implement a publish-subscribe architecture, in which the current user agent subscribes to specific topics, and the current worker agent publishes the response to these topics; (6) The method 600 may use a RESTful architecture, in which the current worker agent may send the response by making an HTTP POST request to an endpoint exposed by the current user agent; (7) The current worker agent may use a Remote Procedure Call (RPC) framework to call a method on the current user agent, passing the response as a parameter.

The current user agent may parse, such as by using a model (such as an LLM), the response to the current part of the user request to extract relevant context information (635). Such an LLM may, for example, have been specifically trained to understand and extract relevant context information from worker agent responses. The extracted information may include key parameters, intermediary results, and other pertinent data points.

The LLM may, for example, be fine-tuned using a specialized loss function that captures two critical dimensions of the parsing task:

Context Preservation: This aspect ensures that the LLM retains the essential contextual information from the current worker agent's response. The loss function for context preservation may utilize Reinforcement Learning from Human Feedback (RLHF), allowing the model to learn from human-guided examples of effective context extraction.

Summarization: This dimension focuses on condensing the extracted information to a manageable size while retaining its relevance. The loss function for summarization may employ a basic token count, encouraging the model to produce concise yet informative extractions.

By combining these two aspects in the loss function, the LLM may be trained to produce extractions that are both contextually rich and efficiently summarized. This approach enables the current user agent to effectively capture and utilize the relevant information from the current worker agent's response, facilitating seamless context threading across multiple agents without requiring direct inter-agent communication.

The method 600 may programmatically structure, by the current user agent, the extracted relevant context information in a manner that enables the extracted relevant context information to be appended to subsequent user requests (640). Such programmatic structuring may be performed in any of a variety of ways and may include, for example, generating specific tokens and including those specific tokens within the extracted relevant context information, and/or embedding certain data fields within the extracted relevant context information. The current user agent may, for example, restructure the current part of the user query to include the extracted relevant context information.

For example, consider a scenario where the current user agent receives the following user query: "Place my usual order for coffee". Assume that the current user agent had previously stored, in a prior conversation, the details of the user's usual order as follows: "Coffee: X, Location: Y". In this case, the current user agent may programmatically restructure the user query (or a part thereof) to be: "Place order for Coffee X from Location Y for User Z".

The method 600 may repeat steps 615-640 for one or more additional parts of the user request. For example, the method 600 may identify a second part of the user request, which may consist of less than all of the user request, and which may be a different part of the user request than the first user request. The second part of the user request may then play the role of the current part of the user request in the next iteration of steps 615-640.

Similarly, the method 600 may identify, by the current user agent, a suitable worker agent capable of handling the current part of the user request, in any of the ways disclosed above in connection with step 615 (645). The worker agent identified in step 645 may then play the role of the current worker agent in the next iteration of steps 615-640. The worker agent identified in step 615 may be the same or different worker agent than the worker agent identified in step 645.

The method 600 constructs an augmented user request based on the additional part of the user request (i.e., the now-current part of the user request) and the extracted relevant context information (650). This augmented user request serves as a new query for the newly-identified (e.g., second) current worker agent. The augmented user request may incorporate not only the additional (e.g., remaining) part of the original user request, but may also append the context extracted from the response of the previous current (e.g., first) worker agent.

To ensure seamless integration of the context into the augmented user request, the method 600 may employ a Large Language Model (LLM). The LLM may aid in maintaining coherence and preventing redundancy by intelligently incorporating the extracted context with into the now-current (e.g., remaining) part of the user request. This process results in a comprehensive and context-aware query that enables the newly-identified current worker agent to process the request more effectively, taking into account the results and insights gained from previous interactions. The method 600 may include executing the same LLM that parsed the user response to construct the augmented user request. The method 600 may include executing a second, separate LLM distinct from the LLM that parsed the user response to construct the augmented user request.

The now-current worker agent, upon receiving the augmented user request, may directly utilize the appended context within the augmented user request to perform the task described by the augmented user request in the next iteration of step 625, without needing to repeat any work that has already been performed by the previously-current worker agent.

If the method 600 identifies only two parts of the user request, then the method 600 may end after step 650. Alternatively, the method 600 may repeat some or all of steps 625-650 iteratively, using the now-current part of the user request and the now-current worker agent. If the now-current part of the user request is the final part of the user request to be processed, then the method 600 may, for example, terminate after repeating only steps 625-640 for the now-current part of the user request and the now-current worker agent. Such termination may be implemented, for example, by determining, after or as part of step 640, whether there are any additional parts of the current user request to be processed, and then: (1) continuing to step 645 if there is at least one additional part of the current user request to be processed; or (2) terminating the method 600 if there are no additional parts of the current user request to be processed. In this way, necessary steps within steps 625-650 may be repeated iteratively until the entire (i.e., all of the) user request has been processed.

Once all worker agents have processed their respective parts of the user request, the current user agent compiles all of the partial responses into a comprehensive final response. This aggregation process involves integrating the results from each worker agent, ensuring that the information is coherent and logically structured. The current user agent delivers this aggregated response back to the current user. This delivery may occur through the user interface generated by the user agent, ensuring that the user receives a cohesive and complete answer to their original request, regardless of how many parts the request was divided into or how many worker agents were involved in processing it.

The current user agent may compile all of the partial responses into a comprehensive final response in any of a variety of ways, such as any one or more of the following in any combination: (1) The current user agent may combine the partial responses in the order they were received, maintaining the logical flow of the original request processing; (2) Using the context extracted during the processing of each part, the current user agent may intelligently integrate the partial responses, ensuring coherence and avoiding redundancy; (3) Leveraging a Large Language Model (LLM), the current user agent may generate a natural language summary that incorporates all the partial responses into a cohesive narrative.

At each stage of the method 600, the method 600 may implement mechanisms for error detection and validation of the concatenated context (i.e., augmented user request) to ensure consistency and accuracy. These mechanisms may, for example, involve performing semantic checks on the augmented user request using a Large Language Model (LLM) and fallback strategies in case of inconsistencies. The method 600 may include executing the same LLM that parsed the user response to perform the semantic checks. The method 600 may include executing a second, separate LLM distinct from the LLM that parsed the user response to perform the semantic check.

The validation process may leverage the concept of "reflection" via LLMs. For example, given the summarized user context, original user query, and re-structured user query, an LLM may be queried to ensure that the re-structured query does not alter the original intention of the user. This reflection process helps maintain the integrity of the user's request throughout the multi-stage processing of the method 600.

The LLM may perform a semantic analysis, comparing the original query's intent with that of the re-structured query. If the LLM detects any significant deviation (e.g., greater than some predetermined threshold) or potential misinterpretation, it may flag the inconsistency for further action, e.g., by the current user.

In cases where the validation process identifies failures or inconsistencies, the method 600 may employ one or more fallback strategies. One such strategy involves prompting the current user with one or more follow-up questions. This approach ensures appropriate user oversight, allowing the current user to clarify their intent or correct any misinterpretations that may have occurred during the query restructuring process. By implementing these intermediate verification mechanisms, the method 600 maintains a high level of accuracy and consistency in processing complex, multi-part user requests across multiple worker agents, while also providing a safeguard against potential errors or misinterpretations.

As indicated above in connection with FIG. 2A (208), the method 20 may include modifying some or all of a user request.

Figure 7:
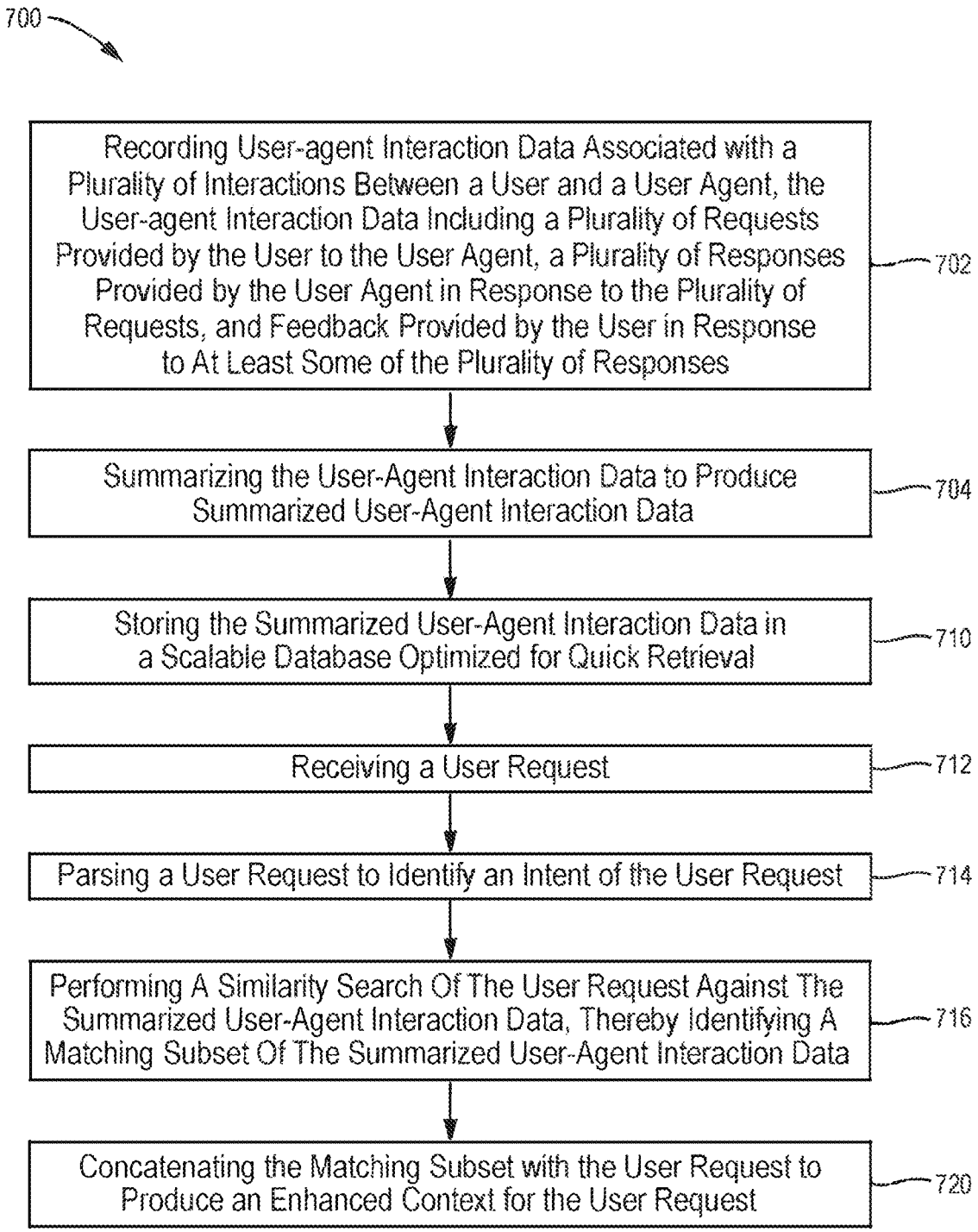
FIG. 7 is a flow diagram depicting one embodiment of a method for enhancing a context for processing a user request in a system for query decomposition, agent ranking, and execution of selected agents from a plurality of agents.

Referring now to FIG. 7, a method 700 for enhancing a context for processing a user request includes: (A) recording user-agent interaction data associated with a plurality of interactions between a user and a user agent, the user-agent interaction data including a plurality of requests provided by the user to the user agent, a plurality of responses provided by the user agent in response to the plurality of requests, and feedback provided by the user in response to at least some of the plurality of responses (702); (B) summarizing the user-agent interaction data to produce summarized user-agent interaction data (704); (C) storing the summarized user-agent interaction data in a scalable database optimized for quick retrieval (710); (D) receiving a user request (712); (E) parsing the user request to identify an intent of the user request (714); (F) performing a similarity search of the user request against the subset of the plurality of data elements, thereby identifying a matching subset of the subset of the plurality of data elements (716); and (G) concatenating the subset of the subset of the subset of the plurality of data elements with the user request to produce an enhanced context for the user request (720). Before describing the method 700 of FIG. 7 in more detail, certain high-level features of the method 700 will be described. The method 700 of FIG. 7, which implements a feature referred to herein as "agent memory," addresses a significant technical challenge in maintaining and utilizing user context for improved user request fulfillment. The challenge lies in how a user agent or worker agent can effectively maintain the context of the user based on past processed requests, to better fulfill future requests from the same user using the available context.

A naive approach to this challenge might involve storing every interaction (request and response pair) between the user and the agent, and then loading all of these interactions into the agent's memory when needed. However, this brute force method quickly becomes infeasible due to memory constraints, especially as the number of interactions grows over time. Large Language Models (LLMs), which are often employed in these agents, have limited context windows that would be rapidly overwhelmed by such an approach. Therefore, the technical challenge is to achieve a similar result—maintaining rich, relevant user context—in a more resource-efficient way. A variety of ways in which the method 700 of FIG. 7 addresses this technical challenge will now be described.

The method 700 records user-agent interaction data associated with a plurality of interactions between a user and a user agent (702). The user-agent interaction data may, for example, include, for each of a plurality of requests provided by the user to the user agent, any one or more of the following: (1) the request; (2) a response provided by the user agent in response to the request; and (3) feedback provided by the user in response to the user agent's response. This step serves as the foundation for building and maintaining the agent memory feature, which aims to enhance the context for processing future user requests.

The purpose of recording user-agent interaction data is to create a comprehensive history of user interactions that can be used to improve the agent's ability to understand and respond to future requests. By capturing this data, the method 700 can learn from past interactions and provide more personalized and contextually relevant responses over time.

Various ways of implementing the recording process of step 702 may include any one or more of the following in any combination: (1) Recording each interaction as it occurs (e.g., in real-time); (2) Storing the user-agent interaction data in a database system optimized for quick retrieval, such as a vector database; (3) Implementing filters to record only specific types of interactions deemed most relevant or valuable for future context; (4) Attaching additional metadata to each interaction, such as timestamp, user ID, and/or interaction type, to facilitate easier retrieval and analysis; (5) Applying NLP techniques to extract key information and entities from the interactions before storage, potentially reducing storage requirements and improving retrieval efficiency; (6) Performing sentiment analysis on the user feedback to identify positive, neutral, and negative feedback, and storing the results of such sentiment analysis within the user-agent interaction data.

The method 700 may summarize the user-agent interaction data to produce summarized user-agent interaction data (704). For example, the summarization performed by the method 700 may include using one or more LLMs specifically designed to parse and comprehend the context of conversations. These models utilize techniques such as extractive summarization, which identifies and extracts the most important sentences or phrases from the original text, and abstractive summarization, which generates new text that captures the essence of the original content. By applying these techniques, the LLMs can effectively distill dialogues into essential snippets, preserving the most crucial information from user-agent interactions.

As another example, the summarization performed by the method 700 may include performing key phrases and entities extraction. The summarization process may, for example, incorporate methods like Named Entity Recognition (NER) to identify and extract key phrases, entities, and user preferences from the user-agent interaction data. This approach allows the system to focus on the most significant elements of the interactions, such as specific topics, products, or services mentioned by the user, as well as any expressed preferences or requirements.

As another example, the summarization performed by the method 700 may include performing context importance modeling, in which a model is developed to assign importance weightages (also referred to herein as weights) to different parts of the interaction. This model prioritizes important snippets based on multiple factors, such as relevance, frequency, and feedback ratings.

By using one or more of these approaches, either individually or in combination, the summarization process of step 704 may create a comprehensive yet concise representation of user-agent interactions.

The method 700 may store the summarized user-agent interaction data in a scalable database optimized for quick retrieval (710). This step has a variety of benefits. For example, by storing only the summarized data, the method 700 may significantly reduce storage requirements compared to retaining all raw interaction data. As another example, the use of a scalable database optimized for quick retrieval ensures that the method 700 may rapidly access relevant context information when processing future user requests. Furthermore, as the volume of user interactions grows over time, the scalable database can accommodate increasing amounts of summarized data without compromising performance.

The storage process of step 710 may, for example, store the summarized user-agent interaction data in one or more vector databases, which are specifically designed for storing and retrieving high-dimensional data like embeddings or feature vectors. These databases can facilitate fast similarity searches, which is useful for identifying relevant context in future interactions. The storage process of step 710 may, for example, implement one or more caching layers to store frequently accessed summaries in faster memory, reducing database load and improving response times. The storage process of step 710 may, for example, apply one or more data compression methods to further reduce storage requirements while maintaining data integrity and quick retrieval capabilities.

The method allows for flexibility in handling the raw interaction data recorded in step 702. Such data may, for example, not be permanently stored, as its primary purpose is to serve as input for the summarization process. Once the summarized data is stored in the scalable database (step 710), the method 700 may, for example, delete or archive the original interaction data from which the summarized data was derived.

The method 700 may receive a user request (712), which may be of any of the kinds disclosed herein.

The method 700 may parse the user request to identify an intent of the user request (714). This parsing step has a variety of purposes and benefits. For example, by identifying the intent of the user request, the method 700 may better understand the context of the user's request, thereby enabling more accurate and relevant responses. Parsing helps refine the user's request, potentially breaking it down into more manageable sub-components for processing. Furthermore, a clear understanding of the intent of the user request facilitates more effective matching with relevant summarized user-agent interaction data in subsequent steps.

The parsing process of step 714 may, for example, be implemented in any of a variety of ways. For example, the parsing may include using any of a variety of NLP algorithms to analyze the syntactic and semantic structure of the user request. The parsing may include using one or more machine learning models trained on datasets of user queries to classify the intent into predefined categories. The parsing may include using a set of predefined rules and patterns to identify common intents in user requests. The parsing may include using a language model, such as an LLM from the GPT family, to understand the underlying meaning and context of the user request. The parsing may combine any of the above techniques.

The method 700 may perform a similarity search of the user request against the summarized user-agent interaction data, thereby identifying a matching subset of the summarized user-agent interaction data (716). By identifying similar past interactions, the method 700 may provide more contextually relevant responses to the current user request.

The similarity search also helps in retrieving personalized information based on the user's past interactions, thereby enhancing the user experience. Furthermore, by focusing on a subset of relevant data, the method 700 may process the request more efficiently than if it had to consider all historical data.

The similarity search can be implemented in any of a variety of ways. For example, the similarity search may include converting the user request into a vector representation and performing a similarity search against vector representations of the summarized interaction data. As another example, the similarity search may use one or more natural language processing techniques to compute semantic similarity between the user request and stored summaries, thereby identifying conceptually similar interactions even if the exact wording differs. The similarity search may use a similarity search algorithm (e.g., cosine similarity, Semantic Search with BERT), which computes similarities between the embedding of the user request and the embeddings of stored summaries to identify the most relevant past interactions.

The method 700 may incorporate importance weighting into the summarization and similarity search processes to enhance the relevance and efficiency of context retrieval. Recall that, during the summarization of the raw user-agent interaction data, the method 700 may assign importance weights to different parts of the interactions. The method 700 may store these weights in association with their corresponding parts of the summarized user-agent interaction data. The same or different weights may be assigned to different parts of the interactions.

The importance weighting may serve multiple purposes. For example, it may allow the method 700 to prioritize more significant or relevant information from past interactions. By ranking relevant snippets based on their importance, the method 700 may optimize the use of limited context windows in Large Language Models (LLMs). The weights may also help in identifying the most pertinent information for the current user request.

The similarity search process of step 716 may leverages these stored importance weights in any one or more of the following ways. When performing the similarity search, the method 700 may consider not only the semantic similarity between the current user request and stored summary data, but also the importance weights associated with different parts of the summaries. The method 700 may use the importance weights to rank the relevant snippets identified during the similarity search. This ranking allows the method 700 to prioritize the most crucial information.

To address the limited context windows of LLMs, the method 700 may retrieve only the top-ranked snippets based on their importance weights, where the number of top-ranked snippets to be retrieved may be set to any value. This approach ensures that the most relevant and significant information fits within the constrained context capacity of the LLM.

The intent of the user request that was identified in step 714 may be used to improve the performance of the similarity search against the summarized user-agent interaction data in any of a variety of ways. For example, the method 700 may use the identified intent to filter the summarized user-agent interaction data before or while performing the similarity search. This pre-filtering step narrows down the search space to only those interactions that are relevant to the current intent, potentially improving both the speed and accuracy of the search.

As another example, the similarity search may give more weight to features or aspects of the summarized data that align with the identified intent. For example, if the intent is identified as a product inquiry, the similarity search may prioritize matching product-related information in the historical data. As another example, when converting the user request into a vector representation for similarity search, the method 700 may incorporate the identified intent as additional context. This may result in a more nuanced embedding that captures not just the literal content of the request but also its underlying purpose.

As another example, the method 700 may employ different retrieval models or algorithms based on the identified intent. For instance, an informational intent might result in the method 700 using a different similarity metric than if the method 700 identifies a transactional intent. As another example, the method 700 may dynamically adjust the similarity threshold for determining relevant matches based on the identified intent. Some intents might require a higher degree of similarity for a match to be considered relevant. As yet another example, after the initial similarity search, the method 700 may re-ranked the results based on their relevance to the identified intent, ensuring that the most intent-relevant matches are prioritized.

The method 700 concatenates the matching subset resulting from step 716 with the user request to produce an enhanced context for the user request (720). This concatenation step serves to enrich the original user request with relevant historical context, enabling more informed and personalized processing of the request.

The method 700 may provide the enhanced context for the user request (also referred to herein as an "enhanced user request"), instead of or in addition to the original user request, to a worker agent for processing, such as within any of the methods disclosed herein in which a user request is provided to a worker request for processing.

The method 700 may develop and deploy a strategy to dynamically adjust which snippets are included based on their relevance and query type. This dynamic adjustment strategy may be implemented in any of a variety of ways. For example, the method 700 may assign a relevance score to each snippet based on its similarity to the current query and its importance weight, and include only snippets above a certain threshold. As another example, the method 700 may categorize the current query into one or more of a plurality of different types (e.g., informational, transactional, navigational) and adjust the inclusion criteria based on the query type. As another example, the method 700 may dynamically adjust the number of included snippets based on the available context window size of the LLM being used. As another example, the method 700 may implement a time-decay function that gives more weight to recent interactions while still considering older, highly relevant snippets. As yet another example, the method 700 may train and deploy a machine learning model that learns from user feedback to optimize snippet selection over time.

By implementing this dynamic adjustment strategy, the method 700 may optimize the enhanced context for each user request, balancing relevance, recency, and available context capacity. This approach ensures that the most pertinent historical information is included, leading to more accurate and personalized responses while efficiently utilizing system resources.

Embodiments of the present invention may incorporate feedback on worker agent performance and personalize task assignment. For example, the system 100 may record which worker agents have interacted with any particular user/user agent and the specific tasks or queries those worker agents have handled. This tracking allows for a comprehensive history of user-worker agent interactions. The system 100 may store user feedback on the performance of worker agents, with particular emphasis on highlighting those worker agents that receive positive reviews. This integration enables the system 100 to maintain a record of user satisfaction with specific worker agents.

The system 100 may assign scores to worker agents based on the cumulative feedback received from users. These scores serve as indicators of the worker agents' performance and their suitability for future tasks. This scoring mechanism allows for quantitative assessment of worker agent effectiveness. For each user, the system 100 may create a profile that encapsulates their preferences, frequently asked queries, and highly rated worker agents. This profiling enables the system 100 to maintain a personalized record of user interactions and preferences, facilitating more tailored responses in future interactions.

The system 100 may utilize the feedback scores to dynamically assign worker agents to future tasks. This allocation may be based on the worker agents' demonstrated proficiency, as indicated by their feedback scores. By doing so, the system 100 aims to match users with the most suitable worker agents for their specific needs.

The system 100 may continuously update the user profiles based on new interactions. This ongoing refinement of the agent assignment process allows the system 100 to adapt to changing user preferences and worker agent performance over time, ensuring that task assignments remain optimized. By implementing these features, the system 100 may create a more efficient and personalized user experience. In particular, it may leverage historical interaction data and user feedback to improve the matching of worker agents to tasks, potentially leading to higher user satisfaction and more effective task completion.

The agent memory feature of the method 700 of FIG. 7 may incorporate additional components to ensure scalability and efficient processing of large volumes of user-agent interactions. For example, the method 700 may implemented one or more distributed computing methods to handle high volumes of interactions efficiently. This approach allows for parallel processing of multiple user-agent interactions across a network of computers or servers, load balancing to distribute computational tasks evenly and prevent bottlenecks, improved fault tolerance, and horizontal scalability which enables the addition or more computing resources as the volume of interactions grows.

The method 700 of FIG. 7 may utilize one or more batch processing techniques to periodically summarize interactions and update the memory snippets database. Such batch processing may include any one or more of: aggregating multiple user-agent interactions over a set period; processing these interactions in bulk; updating the memory snippets database at regular intervals, ensuring that the system's knowledge base remains current while minimizing the impact on real-time performance; and optimizing resource utilization by scheduling batch processes during off-peak hours.

Techniques disclosed herein for performing agent-specific ranking (such as those shown in FIG. 4 and described in connection therewith) address the technical problem of ranking worker agents (such as worker agents that employ machine learning models to process user requests) for a specific request by considering qualitative performance metrics. Ranking techniques disclosed herein may use a multi-factor ranking approach, considering metrics such as throughput, context window, cost per million tokens, declared capabilities, uptime and age in network, and user feedback. Ranking techniques disclosed herein may also use a collaborative filtering model to generate a composite score for each agent and a real-time updating mechanism to recalibrate rankings as new data comes in. Ranking techniques disclosed herein may also integrate machine learning to refine the collaborative filtering model, making such techniques more accurate and adaptive over time. This results in a more nuanced, efficient, and effective method for matching user requests with the most suitable worker agents.

Techniques disclosed herein for agent-specific ranking are fundamentally rooted in computer technology due to features that involve real-time processing, dynamic adaptation, complex data integration and analysis, machine learning integration, high-speed throughput analysis, scalability and distributed processing, and automated decision making. These functions may include monitoring of multiple data streams, instant recalculation of rankings, and immediate adjustment of agent priorities. Such characteristics demonstrate that the agent ranking techniques disclosed herein are not just enhanced by computer technology but are necessarily rooted in it.

Techniques disclosed herein for performing semantic categorization of agents (such as those shown in FIG. 5 and described in connection therewith) address technical problems, such as scalability, agent availability, capability drift, and efficient agent selection. The solutions provided by the semantic categorization techniques disclosed herein include use of a heartbeat algorithm to track agent availability in real-time, a drift monitoring algorithm that uses machine learning to ensure agents remain within their defined capabilities, and a clustering method that groups agents based on semantic similarities. These solutions allow embodiments of the present invention to handle complex tasks in real-time, improving overall system performance and user satisfaction.

The semantic categorization techniques disclosed herein are necessarily rooted in computer technology. Such techniques may, for example, involve real-time processing and scalability for constant monitoring of multiple agents. Such techniques may utilize machine learning for complex data analysis and natural language processing for semantic analysis. Such semantic categorization techniques may also use automated clustering and dynamic recalculation for agent categorization, and real-time query matching for agent selection. The semantic categorization techniques may continually adapt and learn, refining their performance. These capabilities are inherently computational and cannot be replicated mentally or manually.

Embodiments of the agent memory techniques disclosed herein (such as those shown in FIG. 7 and described in connection therewith) address several technical issues in AI-driven conversational interfaces, such as context maintenance, personalization, efficient retrieval, and scalability. Such techniques may, for example, record user-agent interactions and employ Large Language Models (LLMs) to understand the contexts of those interactions. Such techniques may use summarization techniques and Named Entity Recognition to distill dialogues into key snippets and assign importance weights to different parts of the interaction. A scalable database system (such as a vector database) may be used for quick retrieval of these snippets. Agent memory techniques disclosed herein may also employ a query understanding layer and similarity search algorithms to match user queries with stored snippets. Such solutions address the challenges of maintaining context, personalizing responses, and managing memory efficiently in a scalable AI agent system.

Embodiments of the agent memory techniques disclosed herein are necessarily rooted in computer technology due to their reliance on advanced data processing, machine learning algorithms, high-dimensional vector representations, real-time processing, distributed computing, learning and optimization, and integration with LLMs. These computational structures and processes cannot be implemented or performed manually or mentally at least due to their scale, speed, and complexity.

Embodiments of the context threading techniques disclosed herein (such as those shown in FIG. 6 and described in connection therewith) address several technical issues, including context preservation, stateless agent design, and efficient task execution. Such techniques may, for example, use a user agent that manages the orchestration and context preservation between different worker agents, an LLM that parses responses from worker agents and extracts relevant context, a system to structure the extracted context for subsequent queries, a mechanism for the user agent to construct new queries using the remaining part of the original user request and the extracted context, and an iterative process of context extraction, aggregation, and query augmentation. Such techniques may also include mechanisms for error detection and validation of the concatenated context at each stage. Such solutions enable efficient context preservation and threading across multiple agents, while maintaining agent statelessness and minimizing redundant work Embodiments of the context threading techniques disclosed herein are necessarily rooted in computer technology. For example, such techniques may operate within a network of distributed AI agents, use a Large Language Model (LLM) to parse and extract relevant information, and have real-time processing and dynamic adaptation capabilities. Such techniques may also structure extracted context programmatically, maintain a stateless agent architecture, and include error detection and validation mechanisms. Such features are intrinsically tied to computing technology.

Embodiments of the query planning and agent matching techniques disclosed herein (such as those shown in FIG. 3B and described in connection therewith) provide solutions to technical problems, such as dynamic query decomposition, optimal agent selection, and scalability and adaptability. Such embodiments address such technical problems using technical solutions, such as query embedding conversion, worker agent clustering, query enhancement and sub-task generation, intelligent worker agent matching, and adaptive system design. These solutions allow for efficient decomposition of user queries into sub-tasks and optimal matching of these sub-tasks to the most suitable worker agents, improving the overall performance and adaptability of the system in a dynamic, scalable environment.

The query planning and agent matching techniques disclosed herein are necessarily rooted in computer technology. For example, they may use an LLM to convert user queries into embeddings, characterize worker agents, and decompose enhanced queries. Such techniques may transform natural language into high-dimensional vector spaces, employ dynamic clustering and ranking of agents, and use complex matching algorithms. Such features cannot be replicated through manual or mental processes, demonstrating their inherent reliance on computer technology.

Embodiments of the user agent enrollment verification techniques disclosed herein (such as those shown in FIGS. 3A-3B and described in connection therewith) improve computer technology by performing functions such as enforcing a multi-step verification process, which may include embedding generation, similarity analysis, and cryptographic challenges, to ensure only authentic and capable agents are enrolled. Such techniques may use LLMs for capability verification, enhancing Natural Language Processing techniques for agent authentication. Such techniques may also automate the verification process, improving efficiency and consistency.

Such user agent enrollment verification techniques are fundamentally rooted in computer technology, by using techniques such as machine learning algorithms, real-time data processing, cryptographic challenges, and a distributed system architecture. The user agent enrollment verification techniques may generate and analyze high-dimensional vector representations of text and require user agents to create comprehensive query plans. Such techniques cannot be replicated through manual or mental processes, underlining its dependence on and rootedness in computer technology.

Embodiments of the worker agent enrollment verification techniques disclosed herein (such as those shown in FIGS. 3A-3B and described in connection therein) address several technical problems related to verifying the capabilities of worker agents in a distributed AI system. Such techniques ensure that worker agents can perform the tasks they claim to handle, produce outputs that meet system standards, and adapt to diverse capabilities. Such techniques may include a system for generating request-output pairs based on the agent's capabilities, an automated mechanism for comparing the agent's outputs to baseline outputs, a two-tiered verification process involving automated checks and expert assessment, a feedback loop for continuous improvement, and a trial mode for new agents. These solutions collectively provide a comprehensive verification process for enrolling worker agents, ensuring high quality and reliability of the system.

Embodiments of the worker agent enrollment verification techniques are necessarily rooted in computer technology. Such techniques may use automated request-output pair generation, large-scale data processing, comparison algorithms, automated verification checks, real-time feedback and monitoring, distributed system architecture, a scalable verification process, and machine learning. Such features are intrinsically tied to computer technology and cannot be replicated through manual or mental processes.

In some embodiments, the system 100 includes non-transitory, computer-readable medium comprising computer program instructions tangibly stored on the non-transitory computer-readable medium, wherein the instructions are executable by at least one processor to perform each of the steps described above in connection with FIG. 2A-2C and 3A-3D.

It should be understood that the systems described above may provide multiple ones of any or each of those components and these components may be provided on either a standalone machine or, in some embodiments, on multiple machines in a distributed system. The phrases 'in one embodiment,' in another embodiment,' and the like, generally mean that the particular feature, structure, step, or characteristic following the phrase is included in at least one embodiment of the present disclosure and may be included in more than one embodiment of the present disclosure. Such phrases may, but do not necessarily, refer to the same embodiment. However, the scope of protection is defined by the appended claims; the embodiments mentioned herein provide examples.

The terms "A or B", "at least one of A or/and B", "at least one of A and B", "at least one of A or B", or "one or more of A or/and B" used in the various embodiments of the present disclosure include any and all combinations of words enumerated with it. For example, "A or B", "at least one of A and B" or "at least one of A or B" may mean (1) including at least one A, (2) including at least one B, (3) including either A or B, or (4) including both at least one A and at least one B.

Any step or act disclosed herein as being performed, or capable of being performed, by a computer or other machine, may be performed automatically by a computer or other machine, whether or not explicitly disclosed as such herein. A step or act that is performed automatically is performed solely by a computer or other machine, without human intervention. A step or act that is performed automatically may, for example, operate solely on inputs received from a computer or other machine, and not from a human. A step or act that is performed automatically may, for example, be initiated by a signal received from a computer or other machine, and not from a human. A step or act that is performed automatically may, for example, provide output to a computer or other machine, and not to a human.

Although terms such as "optimize" and "optimal" may be used herein, in practice, embodiments of the present invention may include methods which produce outputs that are not optimal, or which are not known to be optimal, but which nevertheless are useful. For example, embodiments of the present invention may produce an output which approximates an optimal solution, within some degree of error. As a result, terms herein such as "optimize" and "optimal" should be understood to refer not only to processes which produce optimal outputs, but also processes which produce outputs that approximate an optimal solution, within some degree of error.

The systems and methods described above may be implemented as a method, apparatus, or article of manufacture using programming and/or engineering techniques to produce software, firmware, hardware, or any combination thereof. The techniques described above may be implemented in one or more computer programs executing on a programmable computer including a processor, a storage medium readable by the processor (including, for example, volatile and non-volatile memory and/or storage elements), at least one input device, and at least one output device. Program code may be applied to input entered using the input device to perform the functions described and to generate output. The output may be provided to one or more output devices.

Each computer program within the scope of the claims below may be implemented in any programming language, such as assembly language, machine language, a high-level procedural programming language, or an object-oriented programming language. The programming language may, for example, be LISP, PROLOG, PERL, C, C++, C#, JAVA, Python, Rust, Go, or any compiled or interpreted programming language.

Each such computer program may be implemented in a computer program product tangibly embodied in a machine-readable storage device for execution by a computer processor. Method steps may be performed by a computer processor executing a program tangibly embodied on a computer-readable medium to perform functions of the methods and systems described herein by operating on input and generating output. Suitable processors include, by way of example, both general and special purpose microprocessors. Generally, the processor receives instructions and data from a read-only memory and/or a random access memory. Storage devices suitable for tangibly embodying computer program instructions include, for example, all forms of computer-readable devices, firmware, programmable logic, hardware (e.g., integrated circuit chip; electronic devices; a computer-readable non-volatile storage unit; non-volatile memory, such as semiconductor memory devices, including EPROM, EEPROM, and flash memory devices; magnetic disks such as internal hard disks and removable disks; magneto-optical disks; and CD-ROMs). Any of the foregoing may be supplemented by, or incorporated in, specially-designed ASICs (application-specific integrated circuits) or FPGAs (Field-Programmable Gate Arrays). A computer can generally also receive programs and data from a storage medium such as an internal disk (not shown) or a removable disk. These elements will also be found in a conventional desktop or workstation computer as well as other computers suitable for executing computer programs implementing the methods described herein, which may be used in conjunction with any digital print engine or marking engine, display monitor, or other raster output device capable of producing color or gray scale pixels on paper, film, display screen, or other output medium. A computer may also receive programs and data (including, for example, instructions for storage on non-transitory computer-readable media) from a second computer providing access to the programs via a network transmission line, wireless transmission media, signals propagating through space, radio waves, infrared signals, etc.

In some embodiments, the system 100 includes non-transitory, computer-readable medium comprising computer program instructions tangibly stored on the non-transitory computer-readable medium, wherein the instructions are executable by at least one processor to perform each of the steps described above in connection with any of FIGS. 2A-7.

Figure 8A:
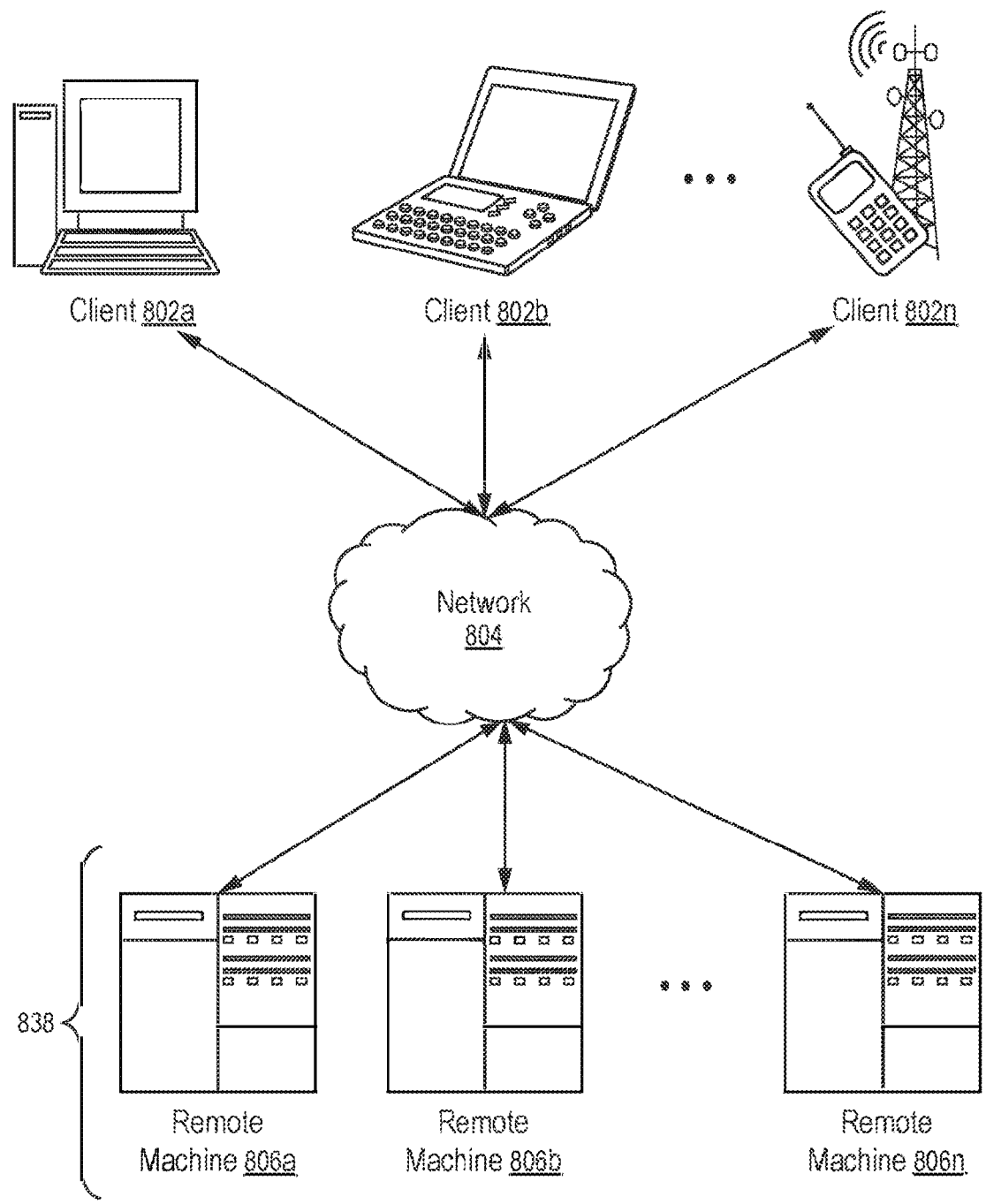
FIGS. 8A-8C are block diagrams depicting embodiments of computers useful in connection with the methods and systems described herein.
Figure 8B:
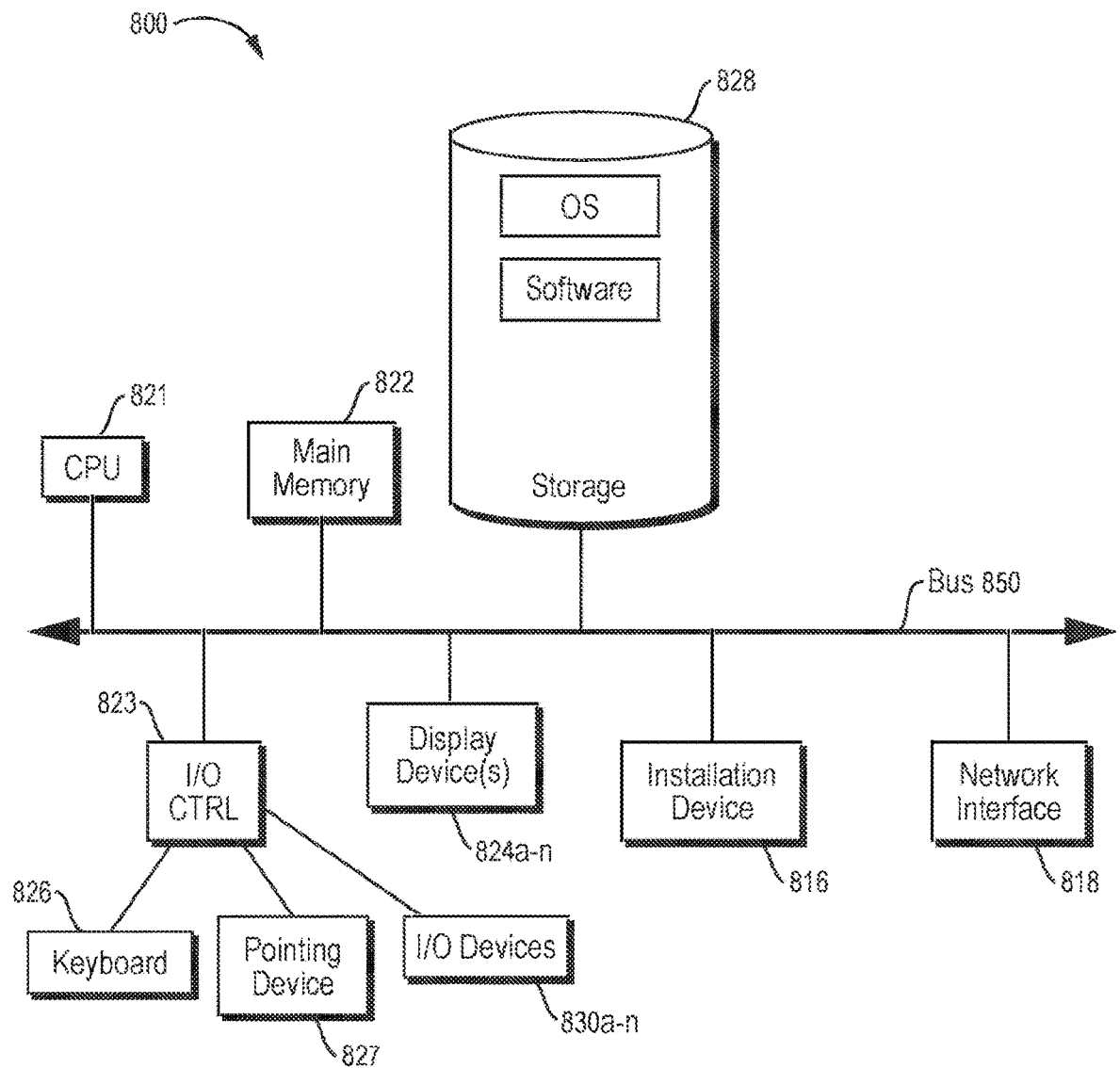
Figure 8C:
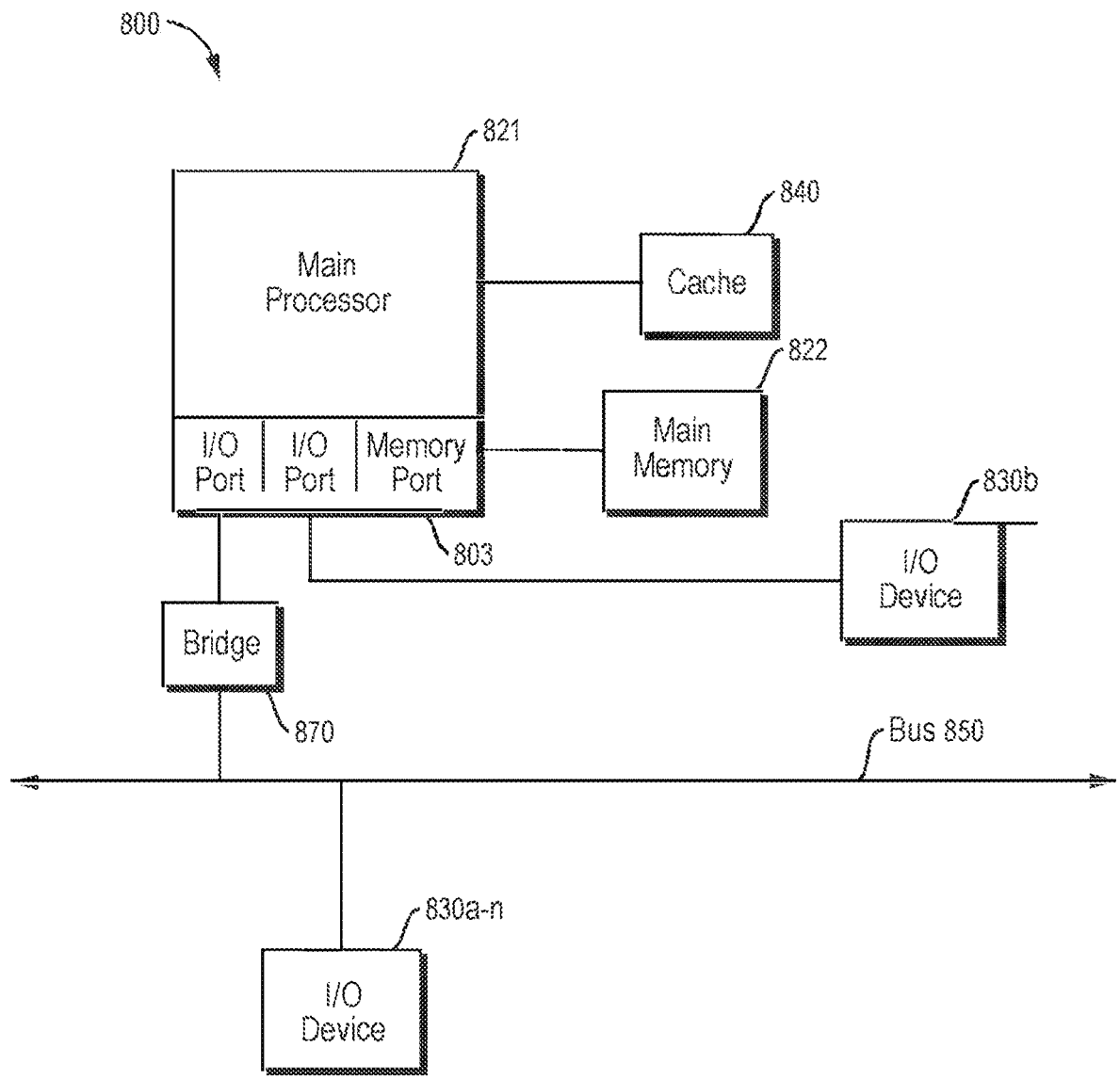

Referring now to FIGS. 8A, 8B, and 8C, block diagrams depict additional detail regarding computing devices that may be modified to execute novel, non-obvious functionality for implementing the methods and systems described above.

Referring now to FIG. 8A, an embodiment of a network environment is depicted. In brief overview, the network environment comprises one or more clients 802a-802n (also generally referred to as local machine(s) 802, client(s) 802, client node(s) 802, client machine(s) 802, client computer(s) 802, client device(s) 802, computing device(s) 802, endpoint(s) 802, or endpoint node(s) 802) in communication with one or more remote machines 806a-806n (also generally referred to as server(s) 806 or computing device(s) 806) via one or more networks 804. Any communication disclosed herein, such as communication shown in FIG. 1A, such as communication between any one of the user agents 102 and the core node 104, and communication between any one of the worker agents 106 and the core node 104, may occur over any embodiment of the network environment depicted in FIG. 8A.

Although FIG. 8A shows a network 804 between the clients 802 and the remote machines 806, the clients 802 and the remote machines 806 may be on the same network 804. The network 804 can be a local area network (LAN), such as a company Intranet, a metropolitan area network (MAN), or a wide area network (WAN), such as the Internet or the World Wide Web. In some embodiments, there are multiple networks 804 between the clients 802 and the remote machines 806. In one of these embodiments, a network 804' (not shown) may be a private network and a network 804 may be a public network. In another of these embodiments, a network 804 may be a private network and a network 804' a public network. In still another embodiment, networks 804 and 804' may both be private networks. In yet another embodiment, networks 804 and 804' may both be public networks.

The network 804 may be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, an SDH (Synchronous Digital Hierarchy) network, a wireless network, a wireline network, an Ethernet, a virtual private network (VPN), a software-defined network (SDN), a network within the cloud such as AWS VPC (Virtual Private Cloud) network or Azure Virtual Network (VNet), and a RDMA (Remote Direct Memory Access) network. In some embodiments, the network 304 may comprise a wireless link, such as an infrared channel or satellite band. The topology of the network 804 may be a bus, star, or ring network topology. The network 804 may be of any such network topology as known to those ordinarily skilled in the art capable of supporting the operations described herein. The network may comprise mobile telephone networks utilizing any protocol or protocols used to communicate among mobile devices (including tables and handheld devices generally), including AMPS, TDMA, CDMA, GSM, GPRS, UMTS, or LTE. In some embodiments, different types of data may be transmitted via different protocols. In other embodiments, the same types of data may be transmitted via different protocols.

A client 802 and a remote machine 806 (referred to generally as computing devices 800 or as machines 800) can be any workstation, desktop computer, laptop or notebook computer, server, portable computer, mobile telephone, mobile smartphone, or other portable telecommunication device, media playing device, a gaming system, mobile computing device, or any other type and/or form of computing, telecommunications or media device that is capable of communicating on any type and form of network and that has sufficient processor power and memory capacity to perform the operations described herein. A client 802 may execute, operate or otherwise provide an application, which can be any type and/or form of software, program, or executable instructions, including, without limitation, any type and/or form of web browser, web-based client, client-server application, an ActiveX control, a JAVA applet, a webserver, a database, an HPC (high performance computing) application, a data processing application, or any other type and/or form of executable instructions capable of executing on client 802.

In one embodiment, a computing device 806 provides functionality of a web server. The web server may be any type of web server, including web servers that are open-source web servers, web servers that execute proprietary software, and cloud-based web servers where a third party hosts the hardware executing the functionality of the web server. In some embodiments, a web server 806 comprises an open-source web server, such as the APACHE servers maintained by the Apache Software Foundation of Delaware. In other embodiments, the web server executes proprietary software, such as the INTERNET INFORMATION SERVICES products provided by Microsoft Corporation of Redmond, WA, the ORACLE IPLANET web server products provided by Oracle Corporation of Redwood Shores, CA, or the ORACLE WEBLOGIC products provided by Oracle Corporation of Redwood Shores, CA.

In some embodiments, the system may include multiple, logically-grouped remote machines 806. In one of these embodiments, the logical group of remote machines may be referred to as a server farm 838. In another of these embodiments, the server farm 838 may be administered as a single entity.

FIGS. 8B and 8C depict block diagrams of a computing device 800 useful for practicing an embodiment of the client 802 or a remote machine 806. As shown in FIGS. 8B and 8C, each computing device 800 includes a central processing unit 821, and a main memory unit 822. As shown in FIG. 8B, a computing device 800 may include a storage device 828, an installation device 816, a network interface 818, an I/O controller 823, display devices 824a-n, a keyboard 826, a pointing device 827, such as a mouse, and one or more other I/O devices 830a-n. The storage device 828 may include, without limitation, an operating system and software. As shown in FIG. 8C, each computing device 800 may also include additional optional elements, such as a memory port 803, a bridge 870, one or more input/output devices 830a-n (generally referred to using reference numeral 830), and a cache memory 840 in communication with the central processing unit 821.

The central processing unit 821 is any logic circuitry that responds to and processes instructions fetched from the main memory unit 822. In many embodiments, the central processing unit 821 is provided by a microprocessor unit, such as: those manufactured by Intel Corporation of Mountain View, CA; those manufactured by Motorola Corporation of Schaumburg, IL; those manufactured by Transmeta Corporation of Santa Clara, CA; those manufactured by International Business Machines of White Plains, NY; or those manufactured by Advanced Micro Devices of Sunnyvale, CA. Other examples include RISC-V processors, SPARC processors, ARM processors, processors used to build UNIX/LINUX "white" boxes, and processors for mobile devices. The computing device 800 may be based on any of these processors, or any other processor capable of operating as described herein.

Main memory unit 822 may be one or more memory chips capable of storing data and allowing any storage location to be directly accessed by the microprocessor 821. The main memory 822 may be based on any available memory chips capable of operating as described herein. In the embodiment shown in FIG. 8B, the processor 821 communicates with main memory 822 via a system bus 850. FIG. 8C depicts an embodiment of a computing device 800 in which the processor communicates directly with main memory 822 via a memory port 803. FIG. 8C also depicts an embodiment in which the main processor 821 communicates directly with cache memory 840 via a secondary bus, sometimes referred to as a backside bus. In other embodiments, the main processor 821 communicates with cache memory 840 using the system bus 850.

In the embodiment shown in FIG. 8B, the processor 821 communicates with various I/O devices 830 via a local system bus 850. Various buses may be used to connect the central processing unit 821 to any of the I/O devices 830, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display device 824, the processor 821 may use an Advanced Graphics Port (AGP) to communicate with the display device 824. FIG. 8C depicts an embodiment of a computing device 800 in which the main processor 821 also communicates directly with an I/O device 830*b* via, for example, HYPERTRANSPORT, RAPIDIO, or INFINIBAND communications technology.

One or more of a wide variety of I/O devices 830*a-n* may be present in or connected to the computing device 800, each of which may be of the same or different type and/or form. Input devices include keyboards, mice, trackpads, trackballs, microphones, scanners, cameras, and drawing tablets. Output devices include video displays, speakers, inkjet printers, laser printers, 3D printers, and dye-sublimation printers. The I/O devices may be controlled by an I/O controller 823 as shown in FIG. 8B. Furthermore, an I/O device may also provide storage and/or an installation medium 816 for the computing device 800. In some embodiments, the computing device 800 may provide USB connections (not shown) to receive handheld USB storage devices such as the USB Flash Drive line of devices manufactured by Twintech Industry, Inc. of Los Alamitos, CA.

Referring still to FIG. 8B, the computing device 800 may support any suitable installation device 816, such as hardware for receiving and interacting with removable storage; e.g., disk drives of any type, CD drives of any type, DVD drives, tape drives of various formats, USB devices, external hard drives, or any other device suitable for installing software and programs. In some embodiments, the computing device 800 may provide functionality for installing software over a network 804. The computing device 800 may further comprise a storage device, such as one or more hard disk drives or redundant arrays of independent disks, for storing an operating system and other software. Alternatively, the computing device 800 may rely on memory chips for storage instead of hard disks.

Furthermore, the computing device 800 may include a network interface 818 to interface to the network 804 through a variety of connections including, but not limited to, standard telephone lines, LAN or WAN links (e.g., 802.11, T1, T3, 56 kb, X.25, SNA, DECNET, RDMA), broadband connections (e.g., ISDN, Frame Relay, ATM, Gigabit Ethernet, Ethernet-over-SONET), wireless connections, virtual private network (VPN) connections, or some combination of any or all of the above. Connections can be established using a variety of communication protocols (e.g., TCP/IP, IPX, SPX, NetBIOS, Ethernet, ARCNET, SONET, SDH, Fiber Distributed Data Interface (FDDI), RS232, IEEE 802.11, IEEE 802.11a, IEEE 802.11b, IEEE 802.11g, IEEE 802.11n, 802.15.4, Bluetooth, ZIGBEE, CDMA, GSM, WiMax, and direct asynchronous connections). In one embodiment, the computing device 800 communicates with other computing devices 800' via any type and/or form of gateway or tunneling protocol such as GRE, VXLAN, IPIP, SIT, ip6tnl, VTI and VTI6, IP6GRE, FOU, GUE, GENEVE, ERSPAN, Secure Socket Layer (SSL) or Transport Layer Security (TLS). The network interface 818 may comprise a built-in network adapter, network interface card, PCMCIA network card, card bus network adapter, wireless network adapter, USB network adapter, modem, or any other device suitable for interfacing the computing device 800 to any type of network capable of communication and performing the operations described herein.

In further embodiments, an I/O device 830 may be a bridge between the system bus 850 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a Serial Plus bus, a SCI/LAMP bus, a Fibre Channel bus, or a Serial Attached small computer system interface bus.

A computing device 800 of the sort depicted in FIGS. 8B and 8C typically operates under the control of operating systems, which control scheduling of tasks and access to system resources. The computing device 800 can be running any operating system such as any of the versions of the MICROSOFT WINDOWS operating systems, the different releases of the UNIX and LINUX operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 7, WINDOWS 8, WINDOWS VISTA, WINDOWS 10, and WINDOWS 11 all of which are manufactured by Microsoft Corporation of Redmond, WA; MAC OS manufactured by Apple Inc. of Cupertino, CA; OS/2 manufactured by International Business Machines of Armonk, NY; Red Hat Enterprise Linux, a Linux-variant operating system distributed by Red Hat, Inc., of Raleigh, NC; Ubuntu, a freely-available operating system distributed by Canonical Ltd. of London, England; CentOS, a freely-available operating system distributed by the centos.org community; SUSE Linux, a freely-available operating system distributed by SUSE, or any type and/or form of a Unix operating system, among others.

Having described certain embodiments of methods and systems for identifying and clustering worker agents for processing requests, it will be apparent to one of skill in the art that other embodiments incorporating the concepts of the disclosure may be used. Therefore, the disclosure should not be limited to certain embodiments, but rather should only be limited by the spirit and scope of the following claims.

What is claimed is:

1. A method, performed by at least one computer processor executing computer program instructions stored on at least one non-transitory computer-readable medium, for ranking a plurality of worker agents based on a user request, the method comprising:
   (A) receiving, by a user agent, a user request including a description of a task;
   (B) generating, by the user agent using a first pre-trained large language model, an embedding of the user request;
   (C) identifying, by the user agent in communication with a second pretrained large language model, a plurality of tasks to be performed to process the user request;
   (D) for each of a plurality of worker agents, computing a corresponding value for each of a plurality of metrics, thereby computing a plurality of metric values for each of the plurality of worker agents, wherein each of the plurality of worker agents comprises at least one model that has been trained using machine learning; and
   (E) generating, for each of the plurality of worker agents, a corresponding ranking, based on the metrics computed for the plurality of worker agents in (D), thereby generating a plurality of worker agent rankings, each of which corresponds to a distinct worker agent in the plurality of worker agents.

2. The method of claim 1, wherein (D) further comprises computing a value of a throughput metric for a worker agent W, based on processing of other user requests by the worker agent W.

3. The method of claim 1 further comprising logging, by the core node, a number of tokens processed per second by each worker agent W.

4. The method of claim 2, wherein (D) further comprises computing the value of the throughput metric for the worker agent W by using the number of tokens processed per second to calculate an average throughput.

5. The method of claim 1, wherein (E) further comprises deprioritizing one of the plurality of worker agents having a value of a throughput metric lower than a second of the plurality of worker agents.

6. The method of claim 1, wherein (D) further comprises computing a value of a context window matching metric for a worker agent W, based on a maximum context window of the worker agent W and a minimum context window required to process the user request.

7. The method of claim 1, wherein (D) further comprises computing a value of an operational cost metric for a worker agent W, based on processing of other user requests by the worker agent W.

8. The method of claim 1, wherein (D) further comprises computing a value of an operational cost metric for a worker agent W by computing an operational cost of the worker agent W on a per-million-token basis.

9. The method of claim 1, wherein (D) further comprises computing a value of a declared capabilities metric for a worker agent W, based on declared capabilities of the worker agent W and tasks required to be performed to process the user request.

10. The method of claim 1, wherein (D) further comprises executing a collaborative filtering method modified to rank at least one attribute of a worker agent.

11. A system comprising at least one non-transitory computer-readable medium having computer program instructions stored thereon, the computer program instructions being executable by at least one computer processor to perform a method, the method comprising:
(A) receiving, by a user agent, a user request including a description of a task;
(B) generating, by the user agent using a first pre-trained large language model, an embedding of the user request;
(C) identifying, by the user agent in communication with a second pretrained large language model, a plurality of tasks to be performed to process the user request;
(D) for each of a plurality of worker agents, computing a corresponding value for each of a plurality of metrics, thereby computing a plurality of metric values for each of the plurality of worker agents, wherein each of the plurality of worker agents comprises at least one model that has been trained using machine learning; and
(E) generating, for each of the plurality of worker agents, a corresponding ranking, based on the metrics computed for the plurality of worker agents in (D), thereby generating a plurality of worker agent rankings, each of which corresponds to a distinct worker agent in the plurality of worker agents.

12. The system of claim 11, wherein (D) further comprises computing a value of a throughput metric for a worker agent W, based on processing of other user requests by the worker agent W.

13. The system of claim 11, wherein the method further comprises logging, by the core node, a number of tokens processed per second by each worker agent W.

14. The system of claim 12, wherein (D) further comprises computing the value of the throughput metric for the worker agent W by using the number of tokens processed per second to calculate an average throughput.

15. The system of claim 11, wherein (E) further comprises deprioritizing one of the plurality of worker agents having a value of a throughput metric lower than a second of the plurality of worker agents.

16. The system of claim 11, wherein (D) further comprises computing a value of a context window matching metric for a worker agent W, based on a maximum context window of the worker agent W and a minimum context window required to process the user request.

17. The system of claim 11, wherein (D) further comprises computing a value of an operational cost metric for a worker agent W, based on processing of other user requests by the worker agent W.

18. The system of claim 11, wherein (D) further comprises computing a value of an operational cost metric for a worker agent W by computing an operational cost of the worker agent W on a per-million-token basis.

19. The system of claim 11, wherein (D) further comprises computing a value of a declared capabilities metric for a worker agent W, based on declared capabilities of the worker agent W and tasks required to be performed to process the user request.

20. The system of claim 11, wherein (D) further comprises executing a collaborative filtering method modified to rank at least one attribute of a worker agent.

* * * * *